(12) United States Patent
Kakihara

(10) Patent No.: US 6,519,122 B1
(45) Date of Patent: Feb. 11, 2003

(54) SPIN-VALVE THIN-FILM ELEMENT

(75) Inventor: Yoshihiko Kakihara, Niigata-ken (JP)

(73) Assignee: Alps Electric Co., Ltd., Tokyo (JP)

(*) Notice: Subject to any disclaimer, the term of this patent is extended or adjusted under 35 U.S.C. 154(b) by 188 days.

(21) Appl. No.: 09/586,494

(22) Filed: Jun. 2, 2000

(30) Foreign Application Priority Data

Jun. 3, 1999 (JP) ............................................. 11-157133

(51) Int. Cl.⁷ ................................................. G11B 5/39
(52) U.S. Cl. .................................. 360/324.12; 360/314
(58) Field of Search ............................ 360/324.1, 324.11, 360/324.12, 314, 322

(56) References Cited

U.S. PATENT DOCUMENTS

| | | | |
|---|---|---|---|
| 5,287,238 A | * 2/1994 | Baumgart et al. | 324/207.21 |
| 5,422,571 A | 6/1995 | Gurney et al. | 360/324.1 |
| 5,508,867 A | 4/1996 | Cain et al. | 360/324.11 |
| 5,661,621 A | * 8/1997 | Kobayashi et al. | 360/324.1 |
| 5,880,911 A | 3/1999 | Ishihara et al. | 360/324 |
| 6,025,979 A | * 2/2000 | Yamane et al. | 360/324.1 |
| 6,090,480 A | * 7/2000 | Hayashi | 324/252 |
| 6,181,534 B1 | * 1/2001 | Gill | 360/324.11 |
| 6,195,239 B1 | * 2/2001 | Araki et al. | 360/324.11 |
| 6,208,492 B1 | * 3/2001 | Pinarbasi | 360/324.11 |

FOREIGN PATENT DOCUMENTS

| JP | 9-115112 | * 5/1997 |
|---|---|---|
| JP | 11-25427 | * 1/1999 |

* cited by examiner

Primary Examiner—David L. Ometz
(74) Attorney, Agent, or Firm—Brinks Hofer Gilson & Lione

(57) ABSTRACT

A spin-valve thin-film element includes a substrate, an antiferromagnetic layer formed on the substrate, a pinned magnetic layer formed on the antiferromagnetic layer, a nonmagnetic conductive layer formed on the pinned magnetic layer, a free magnetic layer formed on the nonmagnetic conductive layer, a hard biasing layer, a conductive layer for supplying a detecting current to the pinned magnetic layer, the nonmagnetic conductive layer, and the free magnetic layer, a biasing conductive layer for controlling the direction of a variable magnetization of the free magnetic layer, and a current supply unit for supplying a current to the conductive layer and the biasing conductive layer. The current applied to the biasing conductive layer forms a current magnetic field for controlling the direction of the variable magnetization of the free magnetic layer. The spin-valve thin-film element exhibits high heat resistance, high reliability, and small asymmetry.

33 Claims, 26 Drawing Sheets

Hi2 < Hp2

Hi3 > Hp3

$Hi5 < Hp5$

SPIN-VALVE THIN-FILM ELEMENT

BACKGROUND OF THE INVENTION

1. Field of the Invention

The present invention relates to a spin-valve thin-film element which causes a change in electrical resistance by the relationship between the direction of pinned magnetization of a pinned magnetic layer and the direction of variable magnetization of a free magnetic layer affected by an external magnetic field, and to a thin-film magnetic head provided with the spin-valve thin-film element. In particular, the present invention relates to a spin-valve thin-film element having a biasing conductive layer in which a current applied to the biasing conductive layer can control the variable magnetization direction of the free magnetic layer, and exhibiting high heat resistance and reliability and small asymmetry, and to a thin-film magnetic head provided with the spin-valve thin-film element.

2. Description of the Related Art

Spin-valve thin-film elements belong to giant magnetoresistive (GMR) elements and detect magnetic fields recorded on recording media such as hard disks. Among the GMR elements, the spin-valve thin-film elements have relatively simplified structures exhibit large rates of change in resistance in response to external magnetic fields, and are sensitive to weak magnetic fields. The spin-valve thin-film elements are classified into single spin-valve thin-film elements and dual spin-valve thin-film elements.

FIG. 21 is a cross-sectional view of a conventional spin-valve thin-film element viewed from an opposing face opposing a recording medium. This spin-valve thin-film element is of a bottom type including a pair of composites, each including an antiferromagnetic layer, a pinned magnetic layer, a nonmagnetic layer, and a free magnetic layer. In FIG. 21, the magnetic recording medium, such as a hard disk moves in the Z direction, and generates a fringing magnetic field in the Y direction.

An antiferromagnetic layer 20 composed of a NiO alloy, a FeMn alloy, or a NiMn alloy is formed on an underlying layer 10 composed of tantalum (Ta). A pinned magnetic layer 30 composed of cobalt (Co) or a NiFe alloy is formed on the antiferromagnetic layer 20. Since the pinned magnetic layer 30 is in contact with the antiferromagnetic layer 20, an exchange coupling magnetic field (an exchange anisotropic magnetic field) is generated between the pinned magnetic layer 30 and the antiferromagnetic layer 20 and the pinned magnetization of the pinned magnetic layer 30 is pinned, for example, in the Y direction in the drawing.

A nonmagnetic conductive layer 40 composed of copper (Cu) is formed on the pinned magnetic layer 30, and a free magnetic layer 50 composed of the same material as that of the pinned magnetic layer 30 is formed on the nonmagnetic conductive layer 40. The free magnetic layer 50 is covered with a protective layer 70 composed of Ta.

Hard biasing layers 60 composed of, for example, a cobalt-platinum (Co—Pt) alloy are formed on both sides of the composite from the underlying layer 10 to the protective layer 70. The hard biasing layers 60 are magnetized in the direction opposite to the X1 direction in the drawing so that the variable magnetization of the free magnetic layer 50 is oriented in the direction opposite to the X1 direction. Thus, the variable magnetization of the free magnetic layer 50 and the pinned magnetization of the pinned magnetic layer 30 are perpendicular to each other.

Conductive layers 80 composed of Cu or the like are formed on the hard biasing layers 60 and lead a detecting current to the pinned magnetic layer 30, the nonmagnetic conductive layer 40, and the free magnetic layer 50.

In this spin-valve thin-film element, the fringing magnetic field from the magnetic recording medium such as the hard disk changes a variable magnetization of the free magnetic layer 50 oriented in the direction opposite to the X1 direction. Such a change in the variable magnetization causes a change in electrical resistance of the spin-valve thin-film element in relation to the pinned magnetization of the pinned magnetic layer 30. As a result, the fringing magnetic field from the magnetic recording medium is detected as a change in voltage due to the change in the electrical resistance.

It is preferable in the spin-valve thin-film element that the variable magnetization of the free magnetic layer 50 and the pinned magnetization of the pinned magnetic layer 30 be close to 90 degrees in order to ensure high heat resistance, high reliability, and small symmetry. The direction of the variable magnetization of the free magnetic layer 50, however, is undesirably tilted from 90 degrees by a magnetostatic coupling magnetic field of the pinned magnetic layer 30 and a current magnetic field of the detecting current.

With reference to FIG. 22, when a magnetostatic coupling magnetic field Hp4 of the pinned magnetic layer 30 and a current magnetic field Hi4 of a detecting current i4 are formed in the same direction (assisting direction), the variable magnetization Hf10 of the free magnetic layer 50 is tilted as variable magnetization Hf11 towards a combined magnetization moment of the magnetostatic coupling magnetic field Hp4 and the current magnetic field Hi4.

With reference to FIG. 23, when a magnetostatic coupling magnetic field Hp5 of the pinned magnetic layer 30 and a current magnetic field Hi5 of a detecting current i5 are formed in different directions (counter directions) from each other and when the magnetostatic coupling magnetic field Hp5 is larger than the current magnetic field Hi5, a variable magnetization Hf20 of the free magnetic layer 50 is tilted as variable magnetization Hf21 towards the combined moment of the magnetostatic coupling magnetic field Hp5 and the current magnetic field Hi5, that is, in the direction of the magnetostatic coupling magnetic field Hp5.

With reference to FIG. 24, when a magnetostatic coupling magnetic field Hp6 of the pinned magnetic layer 30 and a current magnetic field Hi6 of a detecting current i6 are formed in different directions (counter directions) from each other and when the magnetostatic coupling magnetic field Hp6 is smaller than the current magnetic field Hi6, a variable magnetization Hf30 of the free magnetic layer 50 is tilted as variable magnetization Hf31 towards the combined moment of the magnetostatic coupling magnetic field Hp6 and the current magnetic field Hi6, that is, in the direction of the current magnetic field Hi6.

As shown in FIGS. 22 to 24, the tilt of the variable magnetization of the free magnetic layer 50 does not maintain a perpendicular relationship between the variable magnetization of the free magnetic layer 50 and the pinned magnetization of the pinned magnetic layer 30. Thus, heat resistance and reliability are deteriorated, and asymmetry is increased. Accordingly, this spin-valve thin-film element may erroneously process signals from the magnetic recording medium.

FIG. 25 is a cross-sectional view of another conventional spin-valve thin-film element viewed from an opposing face opposing a recording medium. This spin-valve thin-film element is of a dual type including a free magnetic layer and a pair of composites formed on both faces thereof, each including a nonmagnetic conductive layer, a pinned magnetic layer, and an antiferromagnetic layer.

This dual spin-valve thin-film element including two triple-layered composites, each including the free magnetic layer, the nonmagnetic conductive layer, and the pinned magnetic layer, exhibits a larger rate of change in resistance compared to the single spin-valve thin-film element shown in FIG. 21, and is advantageous considering trends toward high-density recording. In FIG. 25, the magnetic recording medium, such as a hard disk, moves in the Z direction and generates a fringing magnetic field in the Y direction.

In the dual spin-valve thin-film element, an underlying layer 41, an antiferromagnetic layer 42, a lower pinned magnetic layer 43, a nonmagnetic conductive layer 44, a free magnetic layer 45, a nonmagnetic conductive layer 46, an upper pinned magnetic layer 47, an antiferromagnetic layer 48, and a protective layer 49 are deposited in that order. Hard biasing layers 32 and conductive layers 33 are formed on both sides of the composite from the underlying layer 41 to the protective layer 49. These layers are substantially composed of the same materials as those of the single spin-valve thin-film element shown in FIG. 21.

Since the lower pinned magnetic layer 43 and the upper pinned magnetic layer 47 are in contact with the antiferromagnetic layer 42 and the antiferromagnetic layer 48, respectively, exchange coupling magnetic fields (exchange anisotropic magnetic fields) are generated between the lower pinned magnetic layer 43 and the antiferromagnetic layer 42 and between the upper pinned magnetic layer 47 and the antiferromagnetic layer 48. The pinned magnetization of the lower pinned magnetic layer 43 and the pinned magnetization of the upper pinned magnetic layer 47 are pinned, for example, in the Y direction in the drawing.

The hard biasing layers 32 are magnetized in the direction opposite to the X1 direction in the drawing so that the variable magnetization of the free magnetic layer 45 is oriented in the direction opposite to the X1 direction. Thus, the variable magnetization of the free magnetic layer 45 is perpendicular to both the pinned magnetization of the lower pinned magnetic layer 43 and the pinned magnetization of the upper pinned magnetic layer 47.

In this dual spin-valve thin-film element, the fringing magnetic field from the magnetic recording medium such as the hard disk changes a variable magnetization of the free magnetic layer 45 oriented in the direction opposite to the X1 direction. Such a change in the variable magnetization causes a change in electrical resistance of the spin-valve thin-film element in relation to the pinned magnetization of the lower pinned magnetic layer 43 and the pinned magnetization of the upper pinned magnetic layer 47. As a result, the fringing magnetic field from the magnetic recording medium is detected as a change in voltage due to the change in the electrical resistance.

It is preferable also in the spin-valve thin-film element that the variable magnetization of the free magnetic layer 45 and the pinned magnetization of the pinned magnetic layers 43 and 47 be close to 90 degrees in order to ensure high heat resistance, high reliability, and small asymmetry.

In the dual spin-valve thin-film element, as shown in FIG. 26, the direction of a variable magnetization Hf40 of the free magnetic layer 45 is undesirably tilted as a variable magnetization Hf41 towards magnetostatic coupling magnetic fields Hp40 and Hp50.

That is, current magnetic fields Hi40 and Hi50 of detecting currents i40 and i50 affect the variable magnetization Hf40 of the free magnetic layer 45 from opposite directions so that the influences are offset. Hence, the direction of the variable magnetization Hf40 of the free magnetic layer 45 is less affected. In contrast, the magnetostatic coupling magnetic fields Hp40 and Hp50 of the lower pinned magnetic layer 43 and the upper pinned magnetic layer 47 affect the variable magnetization Hf40 of the free magnetic layer 45 in the same direction, and thus affect the direction of the variable magnetization Hf40 of the free magnetic layer 45.

As a result, the direction of the variable magnetization Hf40 of the free magnetic layer 45 is tilted as the variable magnetization Hf41 towards combined magnetization moments of the current magnetic fields Hi40 and Hi50 of the magnetostatic coupling magnetic fields Hp40 and Hp50, that is, towards the direction of the current magnetic fields Hi40 and Hi50.

When the variable magnetization Hf41 of the free magnetic layer 45 is tilted, the variable magnetization Hf41 is not perpendicular to the pinned magnetization of the lower pinned magnetic layer 43 and the pinned magnetization of the upper pinned magnetic layer 47. Thus, also in the dual spin-valve thin-film element, heat resistance and reliability are deteriorated, and asymmetry is increased. Accordingly, this spin-valve thin-film element may also erroneously process signals from the magnetic recording medium.

A possible method to control the tilt of the variable magnetization of the free magnetic layer is to control the intensity of the current magnetic field by adjustment of the detecting current. This method changes the direction of the combined magnetization moment of the magnetostatic coupling magnetic field of the pinned magnetic layer and the current magnetic field. A variable range of the detecting current, however, is narrow, and the control of the tilt of the variable magnetization of the free magnetic layer is insufficient.

In the spin-valve thin-film element, as shown in FIG. 22, in which the magnetostatic coupling magnetic field Hp4 of the pinned magnetic layer 30 and the current magnetic field Hi4 of the detecting current i4 are in the same direction (assisting direction), the direction of the variable magnetization Hf10 of the free magnetic layer 50 cannot be readily controlled.

Also in the spin-valve thin-film element, as shown in FIG. 23, in which the magnetostatic coupling magnetic field Hp5 of the pinned magnetic layer 30 and the current magnetic field Hi5 of the detecting current i5 are formed in different directions (counter directions) and the magnetostatic coupling magnetic field Hp5 is larger than the current magnetic field Hi5, the direction of the variable magnetization Hf20 of the free magnetic layer 50 cannot be readily controlled.

Also in the dual spin-valve thin-film element, as shown in FIG. 26, in which the current magnetic fields Hi40 and Hi50 of the detecting currents i40 and i50 affect the variable magnetization Hf40 of the free magnetic layer 45 from opposite directions so that the influences are offset, the direction of the variable magnetization Hf40 of the free magnetic layer 45 cannot be readily controlled.

SUMMARY OF THE INVENTION

Accordingly, it is an object of the present invention to provide a spin-valve thin-film element which can readily control the direction of a variable magnetization of a free magnetic layer and which exhibits high heat resistance, high reliability, and small asymmetry.

It is another object of the present invention to provide a thin-film magnetic head provided with the spin-valve thin-film element.

A spin-valve thin-film element in accordance with the present invention comprises a substrate; an antiferromagnetic layer formed on the substrate; a pinned magnetic layer in contact with the antiferromagnetic layer, the direction of the pinned magnetization being pinned by an exchange coupling magnetic field of the pinned magnetic layer and the antiferromagnetic layer; a nonmagnetic conductive layer formed between the pinned magnetic layer and a free magnetic layer; a biasing layer for orientating the direction of a variable magnetization of the free magnetic layer in a direction perpendicular to the direction of the pinned magnetization of the pinned magnetic layer; a conductive layer applying a detecting current to the pinned magnetic layer, the nonmagnetic conductive layer, and the free magnetic layer; a biasing conductive layer for controlling the direction of the variable magnetization of the free magnetic layer; and at least one current applying means for applying a current to the conductive layer and the biasing conductive layer.

While the arrangement of the layers has been described in a preferred manner, they may be operatively connected in other fashions as long as the required electrical, mechanical, and magnetic properties of a spin valve or magnetic head are achieved. They may also have one or more additional layers between any or all of them.

In this spin-valve thin-film element, the current applied to the biasing conductive layer controls the variable magnetization direction of the free magnetic layer. That is, the variable current magnetic field of the biasing conductive layer compensates for a magnetostatic coupling magnetic field of the pinned magnetic layer and a current magnetic field of the detecting current. The magnetostatic coupling magnetic field affects the variable magnetization direction of the free magnetic layer. The variable current magnetic field controls the variable magnetization direction of the free magnetic layer. Thus, the spin-valve thin-film element exhibits high thermal resistance, superior reliability, and small asymmetry. Herein, the asymmetry means the degree of asymmetry of an output waveform. When a waveform shown in FIG. 27 is output, the asymmetry is defined by the following equation:

$$\text{Asymmetry }(\%)=\{(TAA+)-(TAA-)\}/\{(TAA+)+(TAA-)\}\times 100$$

wherein TAA+ is the maximum output voltage at the positive side and TAA− is the maximum output voltage at the negative side. When the asymmetry reaches zero, the output waveform is highly symmetry.

The asymmetry is zero when the variable magnetization direction of the free magnetic layer is perpendicular to the pinned magnetization direction of the pinned magnetic layer. When the asymmetry is large, information on a recording medium cannot be exactly read out, resulting in errors. Thus, a small asymmetry represents improved reliability of output signal processing and thus a spin-valve thin-film element having a small asymmetry exhibits high read accuracy.

In a preferred embodiment, the spin-valve thin-film element has a dual structure in which the nonmagnetic conductive layer, the pinned magnetic layer, and the antiferromagnetic layer are formed on both sides of the free magnetic layer in the thickness direction.

Since the dual spin-valve thin-film element has two groups of triple layer configurations, each including a free magnetic layer, a nonmagnetic conductive layer, and a pinned magnetic layer, a large rate of change in resistance ΔMR suitable for high-density recording is obtainable compared to single spin-valve thin-film elements.

Preferably, the current is applied to the biasing conductive layer to form a current magnetic field in a direction opposite to a combined magnetization moment of a magnetostatic coupling magnetic field of the pinned magnetic layer and a current magnetic field of the detecting current. The combined magnetization moment affects the variable magnetization direction of the free magnetic layer. In this configuration, the current magnetic field of the biasing conductive layer is opposite to and compensates for the combined magnetization moment of the magnetostatic coupling magnetic field and the current magnetic field. Thus, the variable magnetization direction of the free magnetic layer can be controlled in a desired direction.

When the direction of a magnetostatic coupling magnetic field of the pinned magnetic layer affecting the variable magnetization of the free magnetic layer is the same as the direction of a current magnetic field of the detecting current affecting the variable magnetization of the free magnetic layer, a current is applied to the biasing conductive layer to form a current magnetic field in a direction opposite to the current magnetic field of the detecting current. In this configuration, the current magnetic field of the biasing conductive layer is opposite to and compensates for the magnetostatic coupling magnetic field of the pinned magnetic layer and the current magnetic field of the detecting current. The magnetostatic coupling magnetic field and the current magnetic field affect the variable magnetization direction of the free magnetic layer. Thus, the variable magnetization direction of the free magnetic layer can be controlled in a desired direction.

Preferably, the current is applied to the biasing conductive layer to form a current magnetic field in a direction opposite to a magnetostatic coupling magnetic field of the pinned magnetic layer, which affects the variable magnetization of the free magnetic layer.

In this configuration, the current magnetic field of the biasing conductive layer is opposite to and compensates for the magnetostatic coupling magnetic field of the pinned magnetic layer, which affects the variable magnetization direction of the free magnetic layer. Thus, the variable magnetization direction of the free magnetic layer can be controlled in a desired direction.

Preferably, the biasing conductive layer is in contact with the antiferromagnetic layer. In this configuration, no additional conductive layer for supplying a current to the biasing conductive layer is necessary. Thus, the spin-valve thin-film element can be readily produced.

Preferably, an insulating layer is formed between the biasing conductive layer and the antiferromagnetic layer. The insulating layer prevents shunt loss in the spin-valve thin-film element.

Preferably, the biasing conductive layer and the conductive layer are connected in series. A current in the conductive layer and a current in the biasing conductive layer can be supplied from only one current supply unit. Thus, the spin-valve thin-film element can be readily formed without providing another current supply unit. However, the at least one current applying means may include two current applying means. The first current applying means connected to the biasing conductive layer. The second current applying means connected to the conductive layer.

In this configuration, the connection between the biasing conductive layer and the current supply unit is applicable to both cases when a current is supplied to the biasing conductive layer. The first case is when a current having the same direction as that of the detecting current is supplied to the biasing conductive layer. The second case is when a current having the opposite direction to that of the detecting current is supplied to the biasing conductive layer. Thus, the direction of the current supplied to the biasing conductive layer can be determined without restriction and regardless of the direction of the detecting current.

Moreover, the intensity of the current in the biasing conductive layer can be controlled without restriction while the intensity of the detecting current is not affected. Thus, tilting of the variable magnetization direction of the free magnetic layer due to the magnetostatic coupling magnetic field of the pinned magnetic layer and the current magnetic field of the detecting current is satisfactorily controlled.

As described in the embodiments of the present invention, the variable current magnetic field controls the variable magnetization direction of the free magnetic layer. The variable current magnetic field has a variable direction to compensate for the variable magnetization direction. In operation, the variable direction varies to compensate for changes in the variable magnetization direction. A thin-film magnetic head in accordance with the present invention comprises the above-mentioned spin-valve thin-film element. The thin-film magnetic head exhibits high thermal resistance, superior reliability, and small asymmetry.

DESCRIPTION OF THE PREFERRED EMBODIMENTS

The preferred embodiments of spin-valve thin-film elements of the present invention will now be described in detail with reference to the drawings.

First Embodiment

Figure 1:
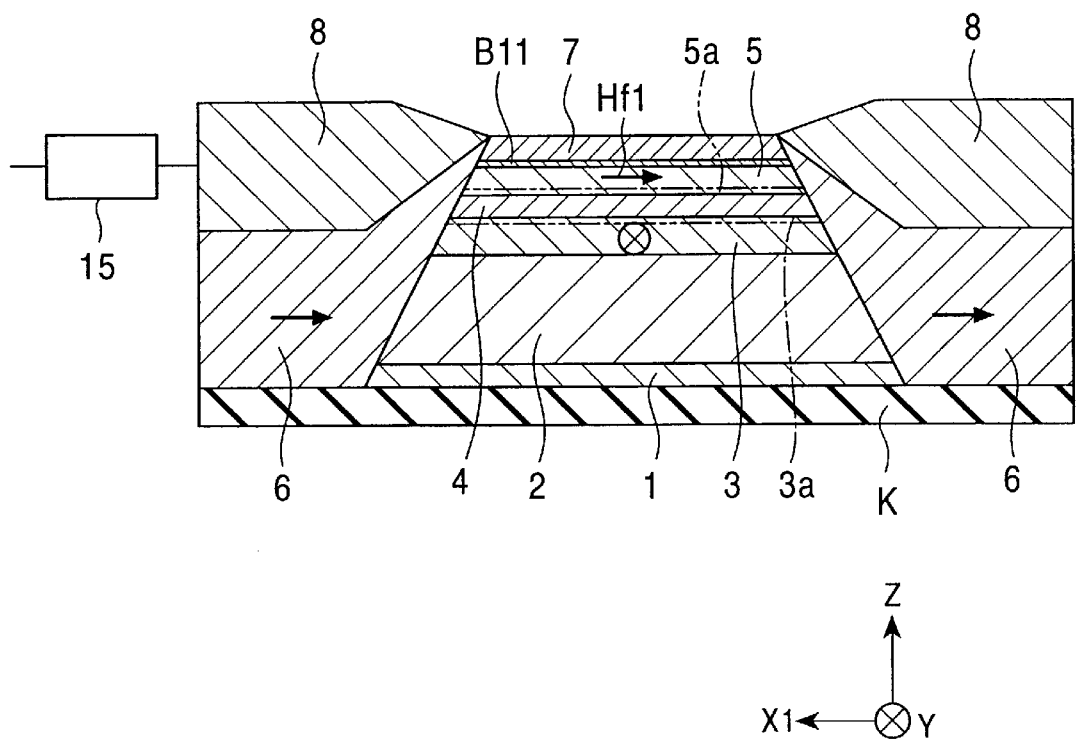
FIG. 1 is a cross-sectional view of a spin-valve thin-film element in accordance with a first embodiment of the present invention, viewed from a face opposing a recording medium.
Figure 2:
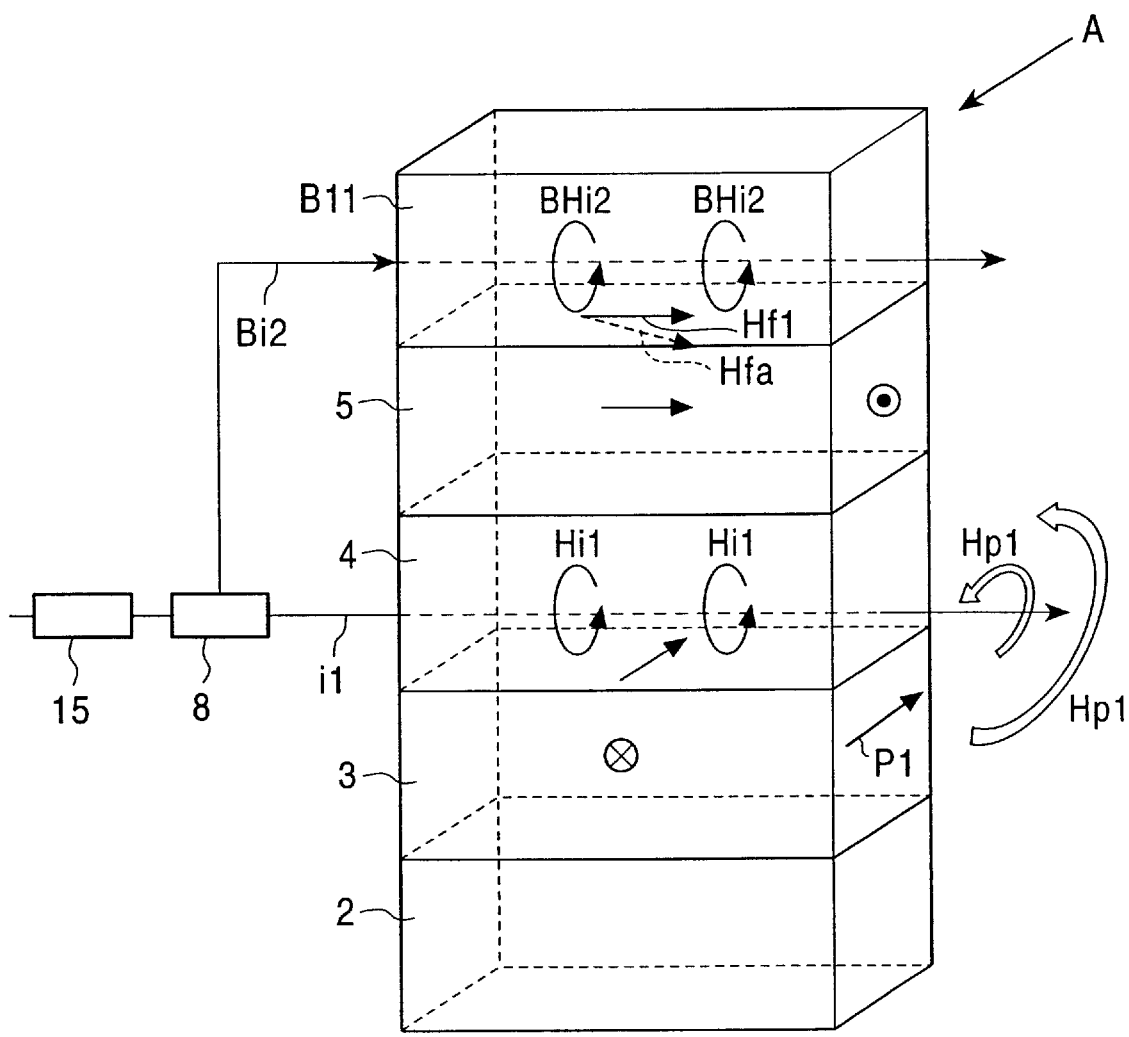
FIG. 2 is a schematic view illustrating magnetization directions of a pinned magnetic layer, a nonmagnetic conductive layer, a free magnetic layer, and a biasing conductive layer of the spin-valve thin-film element in FIG. 1.

FIG. 1 is a cross-sectional view of a spin-valve thin-film element in accordance with a first embodiment of the present invention, viewed from a face opposing a recording medium (hereinafter referred to as "opposing face"), and FIG. 2 is a schematic view illustrating magnetization directions of a pinned magnetic layer, a nonmagnetic conductive layer, a free magnetic layer, and a biasing conductive layer of the spin-valve thin-film element in FIG. 1.

The spin-valve thin-film element of the present invention differs from conventional spin-valve thin-film elements in that the free magnetic layer and the protective layer are separated by the biasing conductive layer. The spin-valve thin-film element in accordance with the first embodiment is a bottom-type single spin-valve thin-film element composed of an antiferromagnetic layer, a pinned magnetic layer, a nonmagnetic conductive layer, and a free magnetic layer.

In this spin-valve thin-film element, a magnetic recording medium, such as a hard disk, moves in the Z direction and fringing magnetic fields are generated from the magnetic recording medium in the Y direction in these drawings.

With reference to FIG. 1, an underlying layer 1 is formed on a substrate K and is composed of, for example, tantalum (Ta). An antiferromagnetic layer 2 is formed on the underlying layer 1, and a pinned magnetic layer 3 is formed on the antiferromagnetic layer 2. A nonmagnetic conductive layer 4 is formed on the pinned magnetic layer 3, and a free magnetic layer 5 is formed on the nonmagnetic conductive layer 4. A biasing conductive layer B11 is formed on the free magnetic layer 5, and a protective layer 7 composed of tantalum or the like is formed on the biasing conductive layer B11. Hard biasing layers 6 and conductive layers 8 are formed on both sides of a composite of the above layers. Numeral 15 represents a current supply unit.

With reference to FIG. 2, the biasing conductive layer B11 is connected in series to the conductive layer 8 so that currents flow in the same direction in the nonmagnetic conductive layer 4 and the biasing conductive layer B11, which are more conductive compared to other layers.

The antiferromagnetic layer 2 typically has a thickness of 300 angstroms, and is preferably formed of a PtMn alloy. The PtMn alloy has higher corrosion resistance, a higher blocking temperature, and a larger exchange coupling magnetic field (a larger exchange anisotropic magnetic field) than those of NiMn alloys and FeMn alloys, which are used in conventional antiferromagnetic layers.

The PtMn alloy may be replaced with an X—Mn alloy, wherein X is an element selected from the group consisting of Pd, Ru, Ir, Rh, and Os, or an X'—Pt—Mn alloy, wherein X' is at least one element selected from the group consisting Pd, Ru, Ir, Rh, Os, Au, Ag, Cr, Ni, Ar, Ne, Xe, and Kr.

In the PtMn alloy and the X—Mn alloy, the contents of the elements Pt and X are in a range of preferably 37 to 63 atomic percent, and more preferably 47 to 63 atomic percent.

In the X'—Pt—Mn alloy, the total content of the elements X' and Pt is in a range of preferably 37 to 63 atomic percent, and more preferably 47 to 57 atomic percent. The content of the element X' is preferably in a range of 0.2 to 10 atomic percent. When the element X' is at least one of Pd, Ru, Ir, Rh, and Os, the content of the element X' is preferably 0.2 to 40 atomic percent.

These alloys are preferably annealed so that the resulting antiferromagnetic layer 2 generates a large exchange coupling magnetic field. When the antiferromagnetic layer 2 is formed of the PtMn alloy, the exchange coupling magnetic field exceeds 800 Oe and the blocking temperature reaches 380° C., wherein the blocking temperature means a temperature at which the antiferromagnetic layer 2 loses the exchange coupling magnetic field.

The pinned magnetic layer 3 is composed of a ferromagnetic material, such as cobalt, a NiFe alloy, a CoNiFe alloy, a CoFe alloy, or a CoNi alloy, and preferably has a thickness of 40 angstroms.

The nonmagnetic conductive layer 4 is composed of a nonmagnetic material, such as copper, chromium, gold, or silver, and generally has a thickness of 20 to 40 angstroms.

The free magnetic layer 5 is preferably formed of the same material as that for the pinned magnetic layer 3 and preferably has a thickness of 80 angstroms.

In such a configuration for generating a giant magnetoresistive effect composed of the pinned magnetic layer 3 and the free magnetic layer 5 separated by the nonmagnetic conductive layer 4, the pinned magnetic layer 3 and the free magnetic layer 5 are preferably composed of the same material so as to suppress the formation of factors which adversely affect the magnetoresistive effect, other than spin-dependent scattering of conduction electrons.

The hard biasing layers 6 generally have a thickness of 300 angstroms, and are preferably composed of a Co—Pt alloy, a Co—Cr—Pt alloy, or a Co—Cr—Ta alloy. The conductive layers 8 are preferably formed of tungsten, copper, chromium, tantalum, or gold. The biasing conductive layer B11 is preferably formed of the same material as that for the conductive layers 8.

The spin-valve thin-film element shown in FIG. 1 is annealed in a magnetic field to generate an exchange coupling magnetic field (an exchange anisotropic magnetic field) at the interface between the antiferromagnetic layer 2 and the pinned magnetic layer 3. Thus, a pinned magnetization P1 of the pinned magnetic layer 3 is fixed, for example, in the Y direction, as shown in FIG. 2. The hard biasing layers 6 are magnetized in a direction opposite to the X1 direction in the drawings, and thus, a variable magnetization Hf1 of the free magnetic layer 5 is also oriented in the direction opposite to the X1 direction. Accordingly, the variable magnetization Hf1 of the free magnetic layer 5 is perpendicular to the pinned magnetization P1 of the pinned magnetic layer 3.

In this spin-valve thin-film element, a detecting current i1 is supplied from the conductive layer 8 to the free magnetic layer 5, the nonmagnetic conductive layer 4, and the pinned magnetic layer 3. As shown in FIG. 2, a magnetostatic coupling magnetic field Hp1 of the pinned magnetic layer 3 and a current magnetic field Hi1 of the detecting current i1 are formed in the same direction (assisting direction) with respect to the variable magnetization Hf1 of the free magnetic layer 5.

A current magnetic field BHi2 of a current Bi2, which is applied to the biasing conductive layer B11 and flows in the same direction (opposite to the X1 direction in the drawing) as that of the detecting current i1, is formed at the opposite side of the magnetostatic coupling magnetic field Hp1 of the pinned magnetic layer 3 and the current magnetic field Hi1 of the detecting current i1 with respect to the variable magnetization Hf1 of the free magnetic layer 5.

It is preferable that the current magnetic field BHi2 in the biasing conductive layer B11, which affects the variable magnetization Hf1 of the free magnetic layer 5, be substantially equal to a combined magnetic moment of the magnetostatic coupling magnetic field Hp1 and the current magnetic field Hi1, which also affect the variable magnetization Hf1. Moreover, it is preferable that the intensity of the current magnetic field BHi2 from the biasing conductive layer B11 be controlled by the intensity of the current Bi2, that is, by the thickness of the biasing conductive layer B11.

The type of the current supply unit 15 is not limited, as long as the current supply unit 15 can supply a desired detecting current i1 and a desired current Bi2 for the biasing conductive layer B11.

When a magnetic field is applied in the Y direction in FIGS. 1 and 2 to the spin-valve thin-film element, the variable magnetization of the free magnetic layer 5 is converted from the direction opposite to the X1 direction to the Y direction. By the variable magnetization, spin-dependent scattering of conductive electrons occurs at the interface between the nonmagnetic conductive layer 4 and the free magnetic layer 5 and at the interface between the nonmagnetic conductive layer 4 and the pinned magnetic layer 3. As a result, the electrical resistance of the spin-valve thin-film element varies. Thus, a fringing magnetic field from a magnetic recording medium can be detected as a change in the electrical resistance of the spin-valve thin-film element.

In the production of the spin-valve thin-film element, the underlying layer 1, the antiferromagnetic layer 2, the pinned magnetic layer 3, the nonmagnetic conductive layer 4, the free magnetic layer 5, the biasing conductive layer B11, and the protective layer 7 are formed on the substrate K in that order, and the composite is annealed.

The annealing is preferably performed at a temperature of 190 to 290° C. At an annealing temperature of less than 190° C., the orientation of the X—Mn alloy or the X'—Pt—Mn alloy constituting the antiferromagnetic layer 2 is unsatisfactory. At an annealing temperature exceeding 290° C., the layers other than the antiferromagnetic layer 2 may be adversely affected.

A lift-off resist is formed on the protective layer 7, and the exposed portion is selectively removed by ion milling to form the composite. Next, the hard biasing layers 6 and the conductive layers 8 are formed in that order on both sides of the composite, and the lift-off resist is removed.

The current supply unit 15 is electrically connected to the conductive layer 8, and the conductive layer 8 is connected to the biasing conductive layer B11 so that the direction of the detecting current i1 and the direction of the current Bi2 are the same.

The direction of the variable magnetization Hf1 of the free magnetic layer 5 can be controlled by applying the current Bi2 to the biasing conductive layer B11, as described above.

The relationships between the variable magnetization Hf1 of the free magnetic layer 5, the magnetostatic coupling magnetic field Hp1 of the pinned magnetic layer 3, the current magnetic field Hi1 of the detecting current i1, and the current magnetic field BHi2 from the biasing conductive layer B11 will be described in detail.

The direction of the variable magnetization Hf1 of the free magnetic layer 5 varies depending on the fringing magnetic field from the recording medium, the magnetostatic coupling magnetic field Hp1 of the pinned magnetic layer 3, the current magnetic field Hi1 of the detecting current i1, and the current magnetic field BHi2 of the current Bi2 in the biasing conductive layer B11. That is, in FIG. 2, the magnetostatic coupling magnetic field Hp1 of the pinned magnetic layer 3 and the current magnetic field Hi1 of the detecting current i1 affect the variable magnetization Hf1 of the free magnetic layer 5 so as to tilt the variable magnetization Hf1 in the direction Hfa which corresponds to the direction (opposite to the Y direction) of the combined magnetic moment of the magnetostatic coupling magnetic field Hp1 and the current magnetic field Hi1. In contrast, the current magnetic field BHi2 from the biasing conductive layer B11 affects the variable magnetization Hf1 so as to tilt the variable magnetization Hf1 towards a direction (Y direction) opposite to the magnetostatic coupling magnetic field Hp1 and the current magnetic field Hi1. Thus, the combined magnetic moment of the magnetostatic coupling magnetic field Hp1 and the current magnetic field Hi1 affecting the variable magnetization Hf1 of the free magnetic layer 5 is offset by the current magnetic field BHi2 from the biasing conductive layer B11. Accordingly, the variable magnetization Hf1 of the free magnetic layer 5 is oriented in the direction opposite to the X1 direction without tilting in the direction of the combined magnetic moment of the magnetostatic coupling magnetic field Hp1 and the current magnetic field Hi1 of the detecting current i1.

As described above, the current Bi2 applied to the biasing conductive layer B11 can offset the combined magnetic moment affecting the variable magnetization Hf1 of the free magnetic layer 5 and can orient the variable magnetization Hf1 of the free magnetic layer 5 in the direction that is perpendicular to the pinned magnetization P1 of the pinned magnetic layer 3. As a result, the spin-valve thin-film element exhibits high thermal resistance, superior reliability, and reduced asymmetry.

Preferably, the current magnetic field BHi2 from the biasing conductive layer B11 is substantially equal to the combined magnetization moment of the magnetostatic coupling magnetic field Hp1 and the current magnetic field Hi1 of the detecting current i1 so as to compensate for the combined magnetization moment affecting the variable magnetization Hf1 of the free magnetic layer 5 and so as not to tilt the variable magnetization Hf1 towards the current magnetic field BHi2. In this case, the variable magnetization Hf1 of the free magnetic layer 5 can be more securely oriented in the direction perpendicular to the pinned magnetization P1 of the pinned magnetic layer 3.

The current magnetic field BHi2 from the biasing conductive layer B11 can be controlled by the intensity of the current Bi2 applied to the biasing conductive layer B11 and by the thickness of the biasing conductive layer B11, which varies the resistance of the biasing conductive layer B11 and thus the current Bi2.

Since the biasing conductive layer B11 is connected in series to the conductive layer 8, the detecting current i1 applied to the conductive layer 8 and the current Bi2 applied to the biasing conductive layer B11 can be supplied from the current supply unit 15. Such a single current supply unit configuration contributes to miniaturization of the spin-valve thin-film element.

Since the antiferromagnetic layer 2 is composed of the X—Mn alloy or the X'—Pt—Mn alloy, the spin-valve thin-film element exhibits a large exchange coupling magnetic field, a high blocking temperature, and high corrosion resistance.

In the PtMn alloy and the X—Mn alloy, when the contents of the elements Pt and X are in a range of 37 to 63 atomic percent, the exchange coupling magnetic field, corrosion resistance, and a rate of change in resistance can be further improved.

In the first embodiment, one pinned magnetic layer 3 is provided on the upper face and one free magnetic layer 5 is provided on the lower face of the nonmagnetic conductive layer 4. Instead, a plurality of pinned magnetic layers 3 and free magnetic layers 5 may be provided on the upper and the lower faces of the nonmagnetic conductive layer 4, respectively.

A giant magnetoresistive effect is produced by spin-dependent scattering of conduction electrons occurring at the interfaces between the nonmagnetic conductive layer 4 and the pinned magnetic layer 3 and between the nonmagnetic conductive layer 4 and free magnetic layer 5. A material which generates noticeable spin-dependent scattering when using with the nonmagnetic conductive layer 4 composed of copper is, for example, cobalt. When the pinned magnetic layer 3 is formed of a material other than cobalt, the surface at the nonmagnetic conductive layer 4 of the pinned magnetic layer 3 is preferably covered with a thin cobalt layer 3a, as shown by a two-dot chain line in FIG. 1. When the free magnetic layer 5 is formed of a material other than cobalt, the surface at the nonmagnetic conductive layer 4 of the free magnetic layer 5 is also preferably covered with a thin cobalt layer 5a, as shown by a two-dot chain line in FIG. 1.

Second Embodiment

Figure 3:
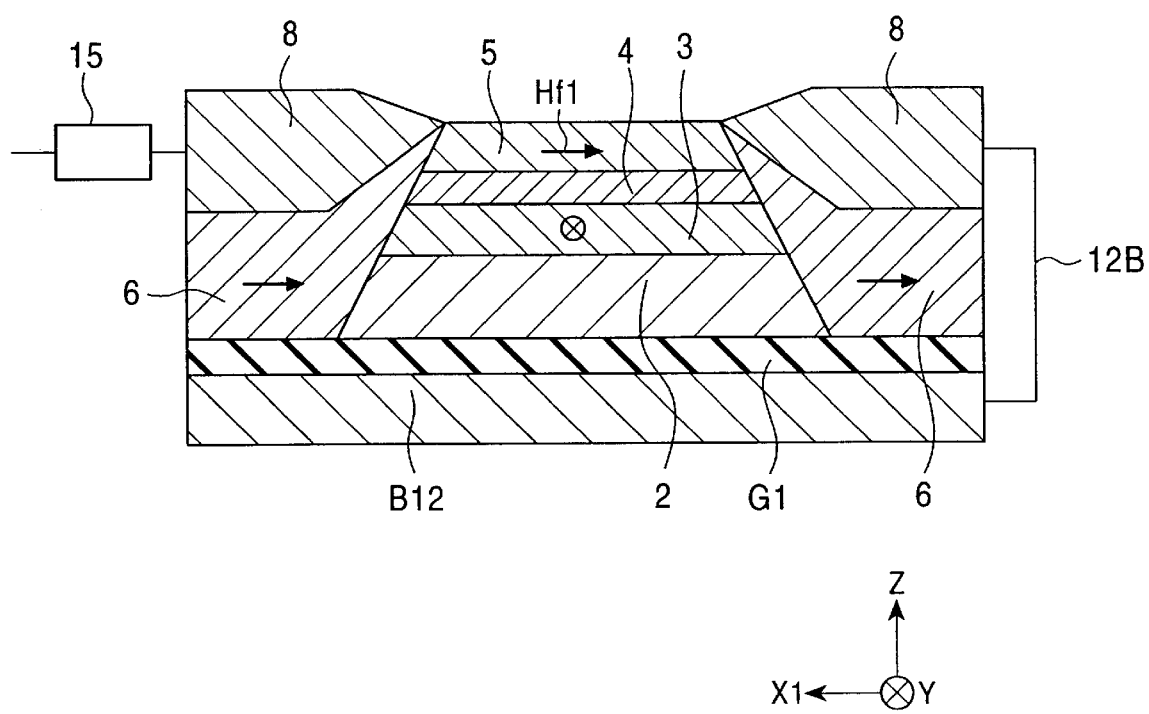
FIG. 3 is a cross-sectional view of a spin-valve thin-film element in accordance with a second embodiment of the present invention, viewed from a face opposing a recording medium.
Figure 4:
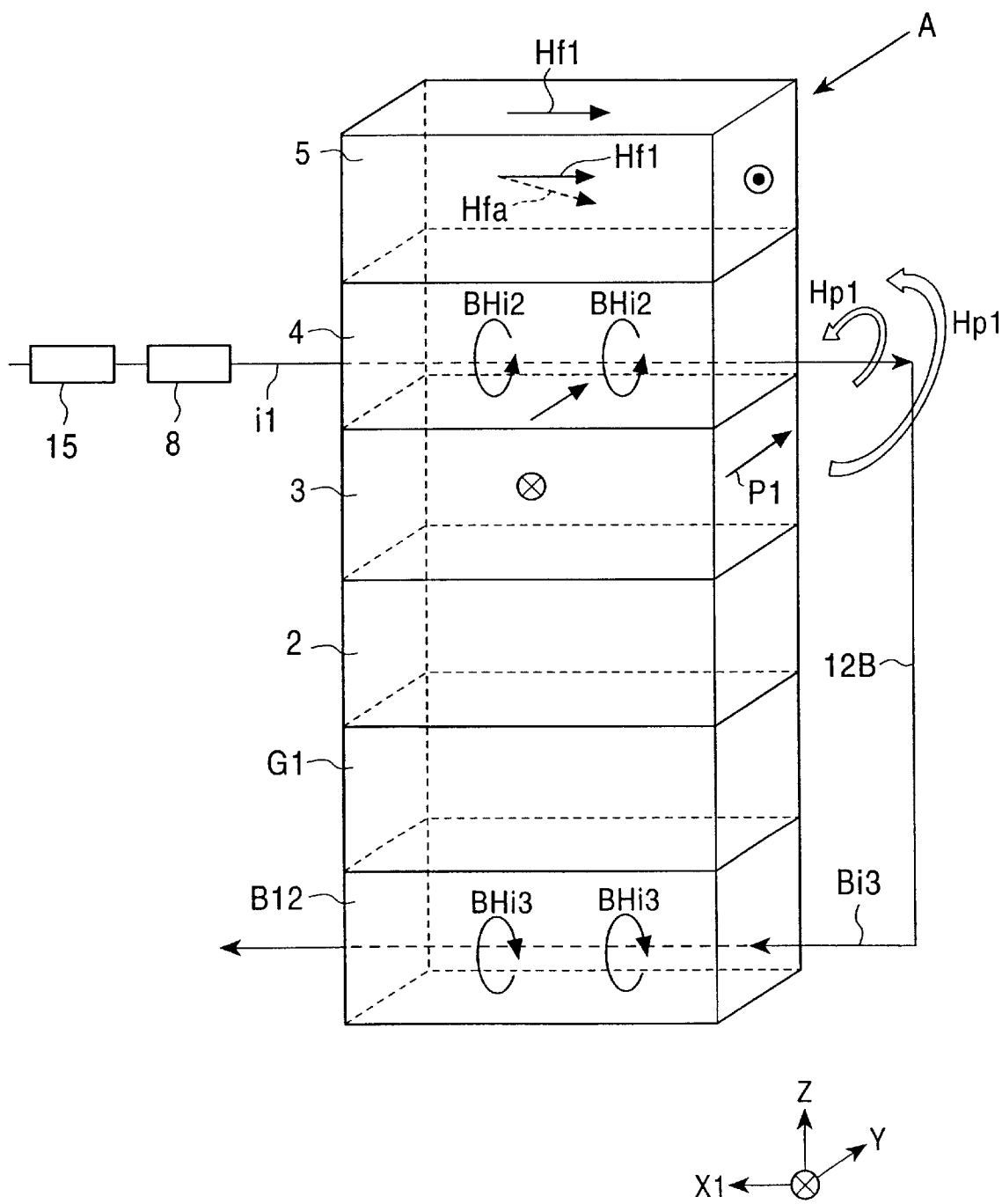
FIG. 4 is a schematic view illustrating magnetization directions of a pinned magnetic layer, a nonmagnetic conductive layer, a free magnetic layer, and a biasing conductive layer of the spin-valve thin-film element in FIG. 3.

FIG. 3 is a cross-sectional view of a spin-valve thin-film element in accordance with a second embodiment, as a modification of the first embodiment of the present invention, viewed from an opposing face, and FIG. 4 is a schematic view illustrating magnetization directions of a pinned magnetic layer, a nonmagnetic conductive layer, a free magnetic layer, and a biasing conductive layer of the spin-valve thin-film element in FIG. 3.

In the second embodiment, as shown in FIGS. 3 and 4, a biasing conductive layer B12 is formed below an antiferromagnetic layer 2 and is separated from the antiferromagnetic layer 2 by an insulating layer G1 at a side away from the pinned magnetic layer 3. The insulating layer G1 is preferably composed of $Al_2O_3$ (alumina), $SiO_2$, or AlN.

With reference to FIG. 4, a conductive layer 8, a nonmagnetic conductive layer 4, and the biasing conductive layer B12 are connected in series via a conductor 12B. A current from a current supply unit 15 flows in the nonmagnetic conductive layer 4, the conductor 12B, and the biasing conductive layer B12. In this embodiment, the direction of the current in the biasing conductive layer B12 is reversed by 180 degrees to the direction in the nonmagnetic conductive layer 4.

Also in the spin-valve thin-film element, as shown in FIG. 4, a current Bi3 is applied to the biasing conductive layer B12 to control a variable magnetization Hf1 of a free magnetic layer 5. That is, the current Bi3 applied to the biasing conductive layer B12 forms a current magnetic field BHi3 that is in a direction opposite to a combined magnetization moment of a magnetostatic coupling magnetic field Hp1 of the pinned magnetic layer 3 and a current magnetic field Hi1 of a detecting current i1. The current magnetic field BHi3 compensates for the combined magnetization moment affecting the variable magnetization Hf1 of the free magnetic layer 5. Thus, the variable magnetization Hf1 is controllable in the direction perpendicular to a pinned magnetization P1 of the pinned magnetic layer 3.

Moreover, the insulating layer G1 provided between the antiferromagnetic layer 2 and the biasing conductive layer B12 can prevent shunt loss in the spin-valve thin-film element.

Third Embodiment

Figure 5:
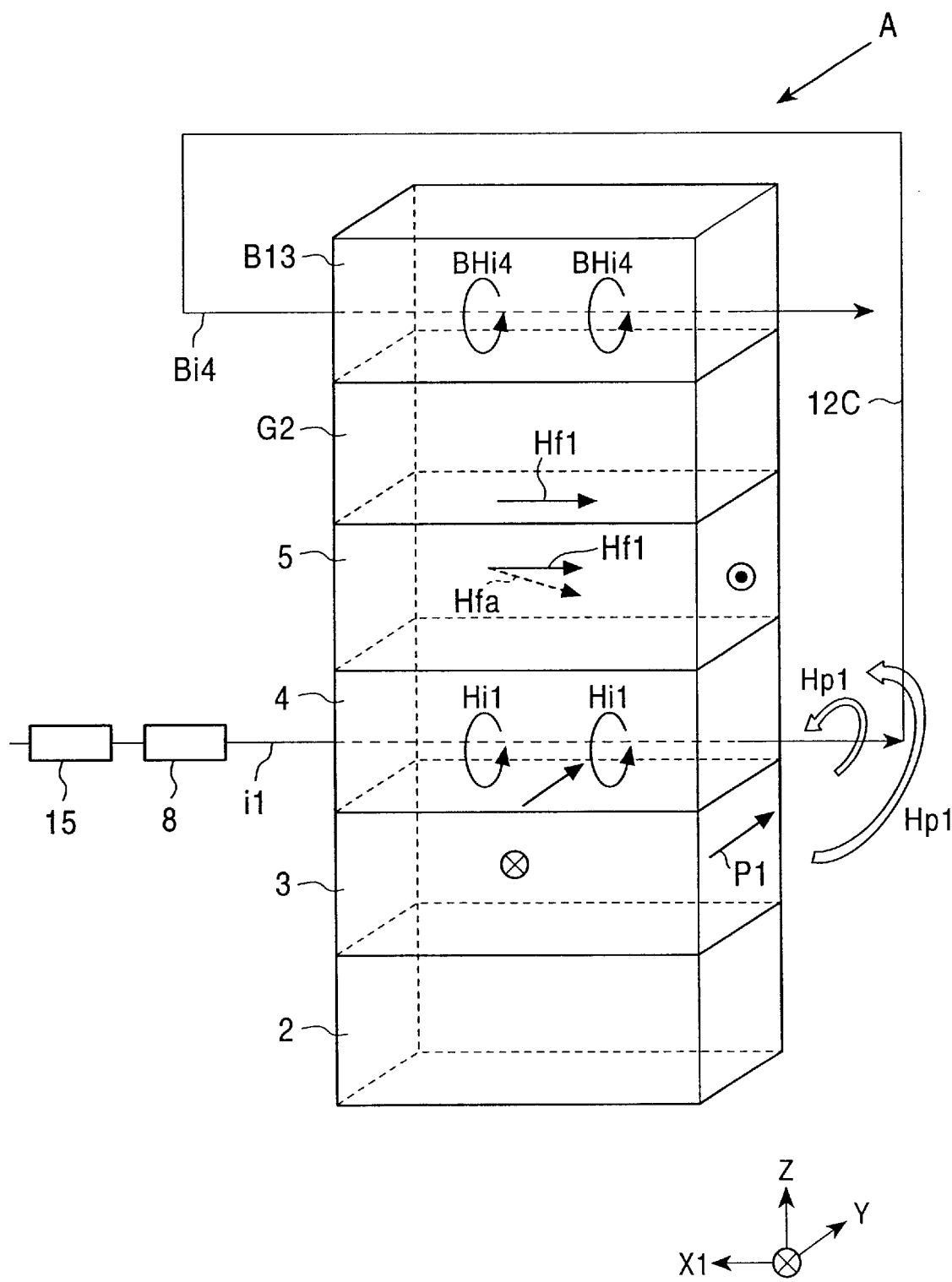
FIG. 5 is a schematic view illustrating magnetization directions of a pinned magnetic layer, a nonmagnetic conductive layer, a free magnetic layer, and a biasing conductive layer of a spin-valve thin-film element in accordance with a third embodiment of the present invention.

FIG. 5 is a schematic view illustrating magnetization directions of a pinned magnetic layer, a nonmagnetic conductive layer, a free magnetic layer, and a biasing conductive layer of a spin-valve thin-film element in accordance with a third embodiment, as a modification of the first embodiment of the present invention.

With reference to FIG. 5, in the third embodiment, an insulating layer G2 is provided between a biasing conductive layer B13 and a free magnetic layer 5. A conductive layer 8, a nonmagnetic conductive layer 4, a conductor 12C, and the biasing conductive layer B13 are connected in series, so that a current Bi4 from a current supply unit 15 flows in the nonmagnetic conductive layer 4 and the biasing conductive layer B13 in the same direction.

The current Bi4 is applied to the biasing conductive layer B13 to control a variable magnetization Hf1 of the free magnetic layer 5. That is, the current Bi4 applied to the biasing conductive layer B13 forms a current magnetic field BHi4 that is in a direction opposite to a combined magnetization moment of a magnetostatic coupling magnetic field Hp1 of a pinned magnetic layer 3 and a current magnetic field Hi1 of a detecting current i1. The current magnetic field BHi4 compensates for the combined magnetization moment affecting the variable magnetization Hf1 of the free magnetic layer 5. Thus, the variable magnetization Hf1 is controllable in the direction perpendicular to the pinned magnetization P1 of the pinned magnetic layer 3.

Moreover, the insulating layer G2 provided between the biasing conductive layer B13 and the free magnetic layer 5 can prevent shunt loss in the spin-valve thin-film element.

Fourth Embodiment

Figure 6:
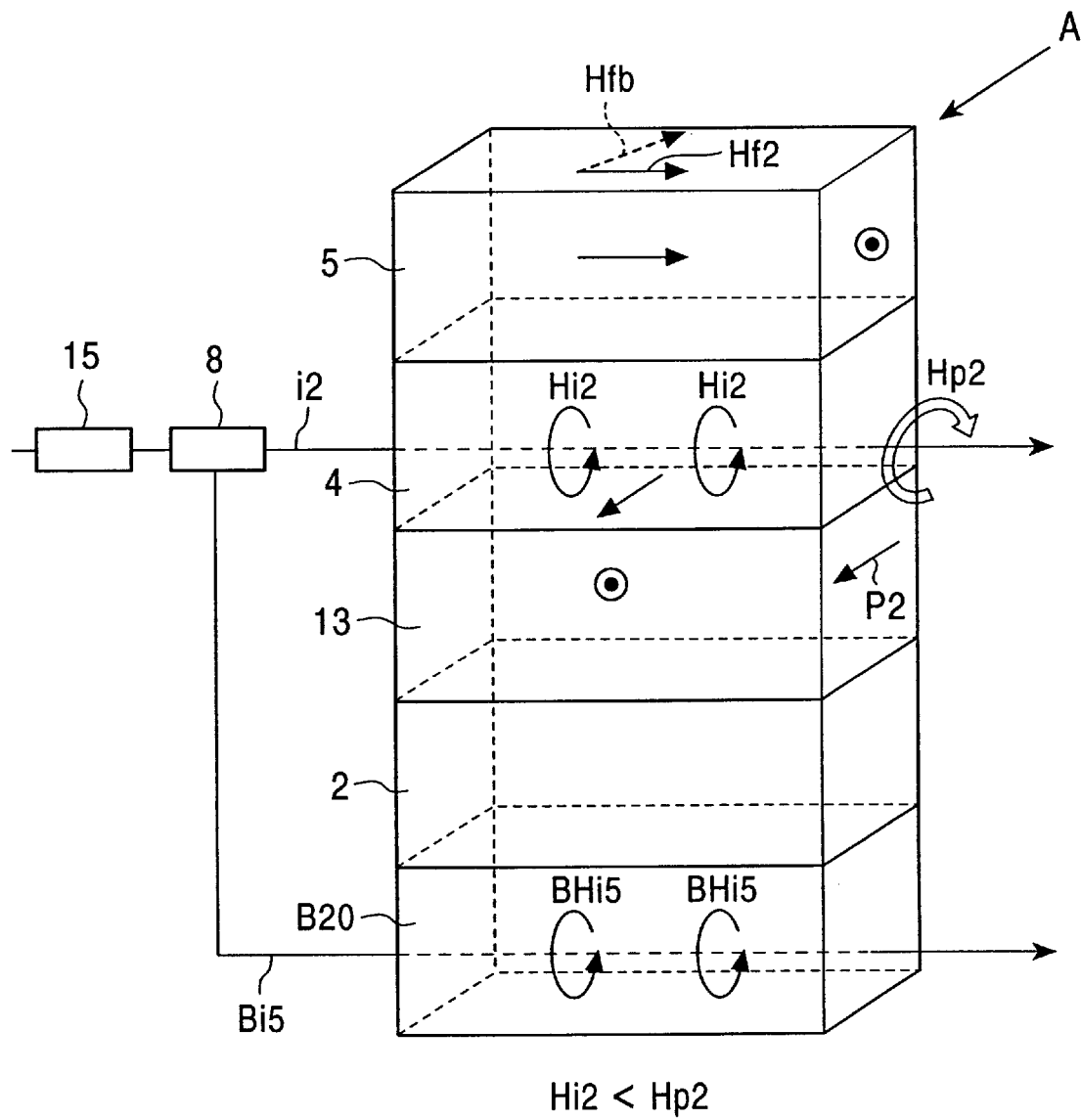
FIG. 6 is a schematic view illustrating magnetization directions of a pinned magnetic layer, a nonmagnetic conductive layer, a free magnetic layer, and a biasing conductive layer of a spin-valve thin-film element in accordance with a fourth embodiment of the present invention.
Figure 6:
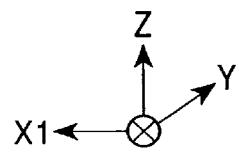

FIG. 6 is a schematic view illustrating magnetization directions of a pinned magnetic layer, a nonmagnetic conductive layer, a free magnetic layer, and a biasing conductive layer of a spin-valve thin-film element in accordance with a fourth embodiment of the present invention.

The spin-valve thin-film element of the fourth embodiment is a bottom-type single spin-valve thin-film element, and the direction of a pinned magnetization P2 of a pinned magnetic layer 13 is reversed to the direction in the spin-valve thin-film elements of the first to third embodiments.

With reference to FIG. 6, a biasing conductive layer B20 is provided under an antiferromagnetic layer 2. The biasing conductive layer B20 is connected in series to a conductive layer 8, and currents from a current supply unit 15 pass through the conductive layer 8 and are divided into two paths for a nonmagnetic conductive layer 4 and the biasing conductive layer B20, which are conductive compared to other layers. That is, the directions of the currents flowing in the nonmagnetic conductive layer 4 and the biasing conductive layer B20 are the same.

In such as spin-valve thin-film element, a magnetostatic coupling magnetic field Hp2 of the pinned magnetic layer 13 affecting the free magnetic layer 5 and a current magnetic field Hi2 of a detecting current i2 are formed in different directions (counter directions) with respect to a variable magnetization Hf2 of the free magnetic layer 5. Moreover, the magnetostatic coupling magnetic field Hp2 is larger than the current magnetic field Hi2.

Furthermore, a current magnetic field BHi5 of a current Bi5 in the biasing conductive layer B20 is opposite to the magnetostatic coupling magnetic field Hp2 of the pinned magnetic layer 13 with respect to the variable magnetization Hf2, in which the current Bi5 and the detecting current i2 flow in the same direction, which is opposite to the X1 direction.

It is preferable that the current magnetic field BHi5, which is applied from the biasing conductive layer B20 to the variable magnetization Hf2 of the free magnetic layer 5, be substantially equal to a combined magnetization moment of the magnetostatic coupling magnetic field Hp2 affecting the variable magnetization Hf2 and the current magnetic field Hi2 of the detecting current i2.

The intensity of the current magnetic field BHi5 from the biasing conductive layer B20 is preferably controlled by the intensity of the current Bi5 applied to the biasing conductive layer B20 and the thickness of the biasing conductive layer B20. That is, the current Bi5 applied to the biasing conductive layer B20 can control the direction of the variable magnetization Hf2 of the free magnetic layer 5.

The relationships between the variable magnetization Hf2 of the free magnetic layer 5, the magnetostatic coupling magnetic field Hp2 of the pinned magnetic layer 13, the current magnetic field Hi2 of the detecting current i2, and the current magnetic field BHi5 from the biasing conductive layer B20 will now be described in detail.

The direction of the variable magnetization Hf2 of the free magnetic layer 5 depends on a fringing magnetic field from a magnetic recording medium, the magnetostatic coupling magnetic field Hp2 of the pinned magnetic layer 13, the current magnetic field Hi2 of the detecting current i2, and the current magnetic field BHi5 of the current Bi5 in the biasing conductive layer B20.

The magnetostatic coupling magnetic field Hp2 of the pinned magnetic layer 13 affects the variable magnetization Hf2 of the free magnetic layer 5 so as to tilt the variable magnetization Hf2 in the direction (Y direction) of the magnetostatic coupling magnetic field Hp2, that is, the direction Hfb in FIG. 6. The current magnetic field Hi2 of the detecting current i2 affects the variable magnetization Hf2 so as to tilt the variable magnetization Hf2 in a direction opposite to the magnetostatic coupling magnetic field Hp2 (opposite to the Y direction).

In this spin-valve thin-film element, the magnetostatic coupling magnetic field Hp2 is larger than the current magnetic field Hi2. Thus, the combined magnetization moment of the magnetostatic coupling magnetic field Hp2 and the current magnetic field Hi2, that is, the magnetostatic coupling magnetic field Hp2 (Y direction), affects the variable magnetization Hf2 so as to tilt the variable magnetization Hf2 of the free magnetic layer 5 in the direction Hfb.

In contrast, the current magnetic field BHi5 from the biasing conductive layer B20 affects the variable magnetization Hf2 so as to tilt the variable magnetization Hf2 in the direction opposite to the combined magnetization moment (opposite to the Y direction). As a result, the combined magnetization moment of the magnetostatic coupling magnetic field Hp2 and the current magnetic field Hi2 is compensated for by the current magnetic field BHi5.

Thus, the variable magnetization Hf2 is oriented in the direction opposite to the X1 direction without being tilted in the direction of the combined magnetization moment of the magnetostatic coupling magnetic field Hp2 and the current magnetic field Hi2.

As described above, the current Bi5 applied to the biasing conductive layer B20 forms the current magnetic field BHi5 which is opposite to the combined magnetization moment of the magnetostatic coupling magnetic field Hp2 of the pinned magnetic layer 13 and the current magnetic field Hi2 of the detecting current i2 and compensates for the combined magnetization moment affecting the variable magnetization Hf2 of the free magnetic layer 5. Accordingly, the variable magnetization Hf2 of the free magnetic layer 5 can be oriented in a direction perpendicular to the pinned magnetization P2 of the pinned magnetic layer 13. The resulting spin-valve thin-film element exhibits high thermal resistance, superior reliability, and reduced asymmetry.

Since the biasing conductive layer B20 is in contact with the antiferromagnetic layer 2, no conductive layer for supplying a current to the biasing conductive layer B20 is required. Thus, the spin-valve thin-film element of this embodiment can be readily produced.

Fifth Embodiment

Figure 7:
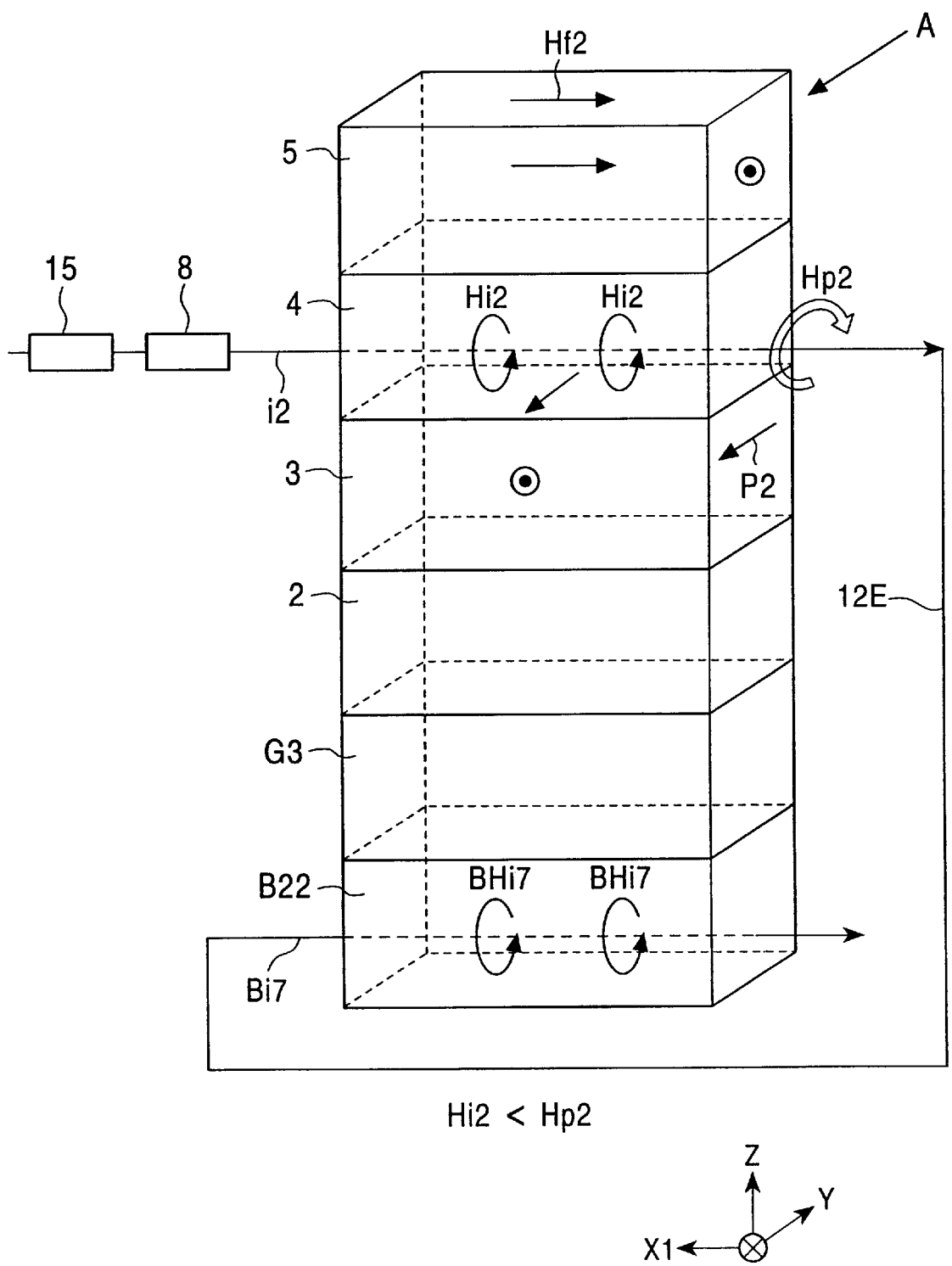
FIG. 7 is a schematic view illustrating magnetization directions of a pinned magnetic layer, a nonmagnetic conductive layer, a free magnetic layer, and a biasing conductive layer of a spin-valve thin-film element in accordance with a fifth embodiment of the present invention.

FIG. 7 is a schematic view illustrating magnetization directions of a pinned magnetic layer, a nonmagnetic conductive layer, a free magnetic layer, and a biasing conductive layer of a spin-valve thin-film element in accordance with a fifth embodiment, as a modification of the fourth embodiment of the present invention.

As shown in FIG. 7, an insulating layer G3 is provided between an antiferromagnetic layer 2 and a biasing conductive layer B22 in the spin-valve thin-film element of the fifth embodiment. A conductive layer 8, a nonmagnetic conductive layer 4, a conductor 12E, and the biasing conductive layer B22 are connected in series so that currents supplied to the nonmagnetic conductive layer 4 and the biasing conductive layer B22 flow in the same direction.

A current Bi7 supplied to the biasing conductive layer B22 can control the direction of a variable magnetization Hf2 of the free magnetic layer 5. That is, the current Bi7 forms a current magnetic field BHi7 which is opposite to a combined magnetization moment of a magnetostatic coupling magnetic field Hp2 of a pinned magnetic layer 13 and a current magnetic field Hi2 of a detecting current i2, and compensates for the combined magnetization moment affecting the variable magnetization Hf2 of the free magnetic layer 5. As a result, the variable magnetization Hf2 of the free magnetic layer 5 can be oriented in a direction that is perpendicular to a pinned magnetization P2 of the pinned magnetic layer 13.

The insulating layer G3 provided between the antiferromagnetic layer 2 and the biasing conductive layer B22 can prevent shunt loss in the spin-valve thin-film element.

Sixth Embodiment

Figure 8:
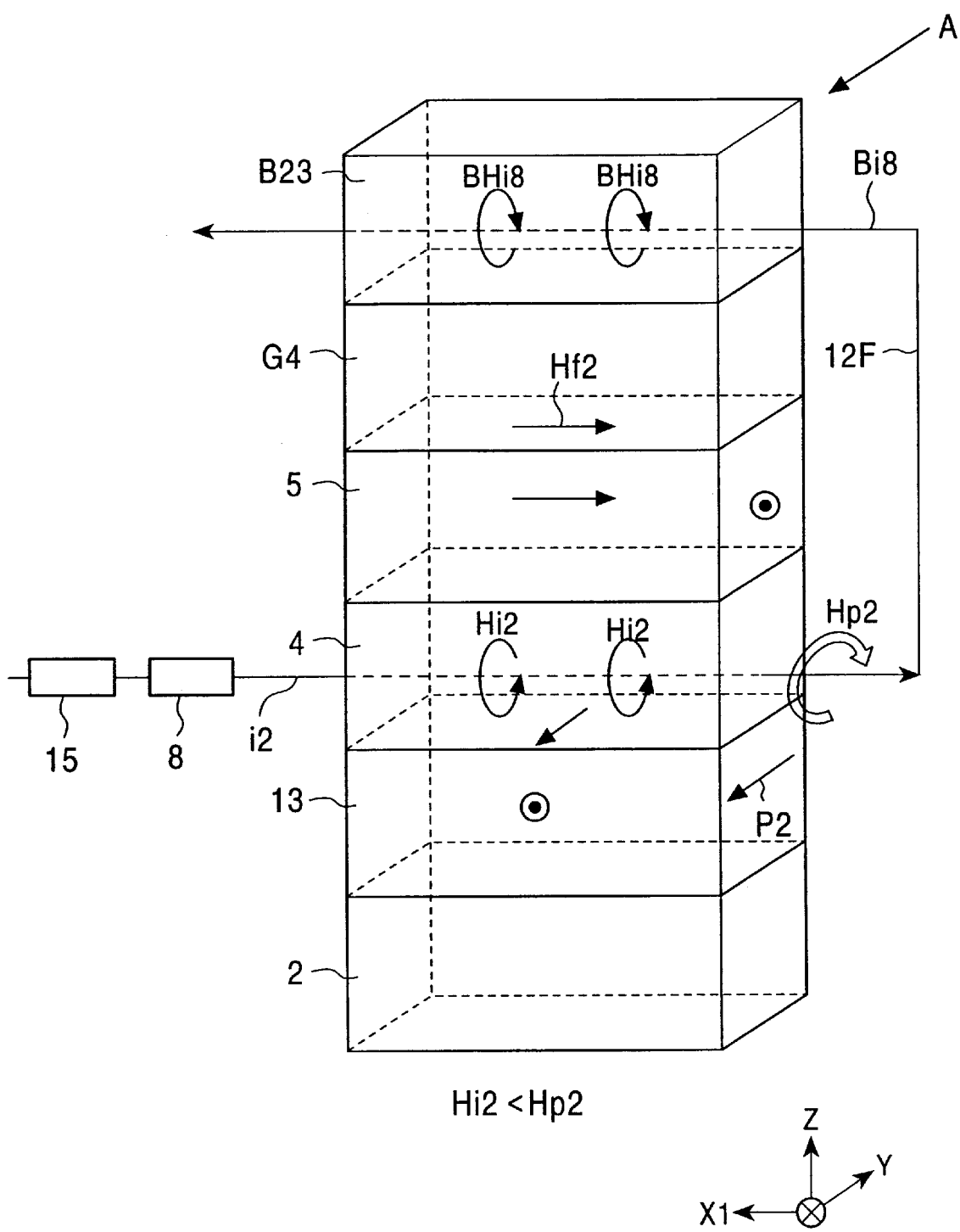
FIG. 8 is a schematic view illustrating magnetization directions of a pinned magnetic layer, a nonmagnetic conductive layer, a free magnetic layer, and a biasing conductive layer of a spin-valve thin-film element in accordance with a sixth embodiment of the present invention.

FIG. 8 is a schematic view illustrating magnetization directions of a pinned magnetic layer, a nonmagnetic conductive layer, a free magnetic layer, and a biasing conductive layer of a spin-valve thin-film element in accordance with a sixth embodiment, as a modification of the fourth embodiment of the present invention.

As shown in FIG. 8, a biasing conductive layer B23 is formed on a free magnetic layer 5 with an insulating layer G4 provided therebetween, away from a nonmagnetic conductive layer 4. A conductive layer 8, the nonmagnetic conductive layer 4, a conductor 12F, and the biasing conductive layer B23 are connected in series, and a current in the nonmagnetic conductive layer 4 and a current in the biasing conductive layer B23 flow in directions opposing by 180 degrees from a current supply unit 15 via the conductive layer 8.

A current Bi8 supplied to the biasing conductive layer B23 can control the direction of a variable magnetization Hf2 of the free magnetic layer 5. That is, the current Bi8 forms a current magnetic field BHi8 which is opposite to a combined magnetization moment of a magnetostatic coupling magnetic field Hp2 of a pinned magnetic layer 13 and a current magnetic field Hi2 of a detecting current i2, and compensates for the combined magnetization moment affecting the variable magnetization Hf2 of the free magnetic layer 5. As a result, the variable magnetization Hf2 of the free magnetic layer 5 can be oriented in a direction, which is perpendicular to a pinned magnetization P2 of the pinned magnetic layer 13.

The insulating layer G4 provided between the biasing conductive layer B23 and the free magnetic layer 5 can prevent shunt loss in the spin-valve thin-film element.

Seventh Embodiment

Figure 9:
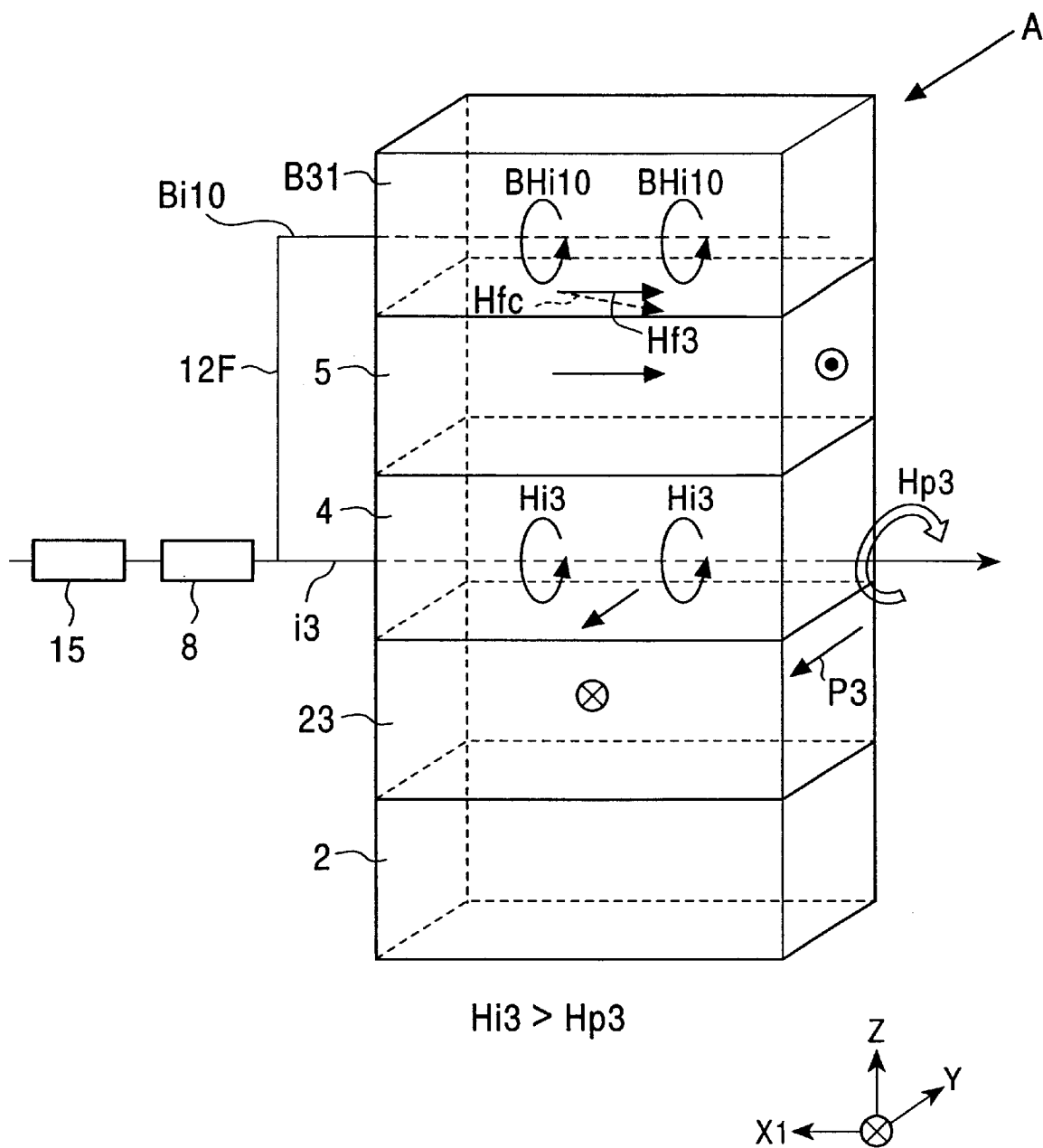
FIG. 9 is a schematic view illustrating magnetization directions of a pinned magnetic layer, a nonmagnetic conductive layer, a free magnetic layer, and a biasing conductive layer of a spin-valve thin-film element in accordance with a seventh embodiment of the present invention.

FIG. 9 is a schematic view illustrating magnetization directions of a pinned magnetic layer, a nonmagnetic conductive layer, a free magnetic layer, and a biasing conductive layer of a spin-valve thin-film element in accordance with a seventh embodiment of the present invention.

The spin-valve thin-film element of the seventh embodiment is a bottom-type single spin-valve thin-film element in which the direction of a pinned magnetization P3 of a pinned magnetic layer 23 is reversed compared to the spin-valve thin-film elements shown in FIGS. 1 to 5.

The spin-valve thin-film element of the seventh embodiment differs from the spin-valve thin-film element of the second embodiment in that a magnetostatic coupling magnetic field Hp3 of the pinned magnetic layer 23 is smaller than a current magnetic field Hi3 of a detecting current i3.

A conductive layer 8 and a biasing conductive layer B31 are connected in series so that currents flow in the same direction in the nonmagnetic conductive layer 4 and the biasing conductive layer B31 from a current supply unit 15 via the conductive layer 8.

The magnetostatic coupling magnetic field Hp3 of the pinned magnetic layer 23 affecting a free magnetic layer 5 and the current magnetic field Hi3 of the detecting current i3 are formed in different directions (counter directions) with respect to a variable magnetization Hf3 of the free magnetic layer 5. Moreover, the magnetostatic coupling magnetic field Hp3 is smaller than the current magnetic field Hi3.

A current magnetic field BHi10 of a current Bi10 in the biasing conductive layer B31 is opposite to the current magnetic field Hi3 of the detecting current i3 with respect to the variable magnetization Hf3, in which the current Bi10 and the detecting current i3 flow in the same direction (opposite to the X1 direction).

It is preferable that the current magnetic field BHi10 in the biasing conductive layer B31, which affects the variable magnetization Hf3 of the free magnetic layer 5, be substantially equal to a combined magnetic moment of the magnetostatic coupling magnetic field Hp3 and the current magnetic field Hi3 of the detecting current i3, which also affect the variable magnetization Hf3. Moreover, it is preferable that the intensity of the current magnetic field BHi10 from the biasing conductive layer B31 be controlled by the intensity of the current Bi10, that is, by the thickness of the biasing conductive layer B31.

The direction of the variable magnetization Hf3 of the free magnetic layer 5 can be controlled by applying the current Bi10 to the biasing conductive layer B31.

The relationships between the variable magnetization Hf3 of the free magnetic layer 5, the magnetostatic coupling magnetic field Hp3 of the pinned magnetic layer 23, the current magnetic field Hi3 of the detecting current i3, and the current magnetic field BHi10 from the biasing conductive layer B31 will be described in detail.

The direction of the variable magnetization Hf3 of the free magnetic layer 5 varies depending on the fringing magnetic field from the recording medium, the magnetostatic coupling magnetic field Hp3 of the pinned magnetic layer 23, the current magnetic field Hi3 of the detecting current i3, and the current magnetic field BHi10 of the current Bi10 in the biasing conductive layer B31. That is, in FIG. 9, the current magnetic field Hi3 of the detecting current i3 affects the variable magnetization Hf3 of the free magnetic layer 5 so as to tilt the variable magnetization Hf3 in the direction Hfc that corresponds in the direction of the current magnetic field Hi3 (opposite to the Y direction). In contrast, the magnetostatic coupling magnetic field Hp3 of the pinned magnetic layer 23 affect the variable magnetization Hf3 so as to tilt the variable magnetization Hf3 in a direction (Y direction) which is opposite to the current magnetic field Hi3 of the detecting current i3.

In this spin-valve thin-film element, the magnetostatic coupling magnetic field Hp3 is smaller than the current magnetic field Hi3 of the detecting current i3. As a result, a combined magnetization moment of the magnetostatic coupling magnetic field Hp3 and the current magnetic field Hi3 affects the variable magnetization Hf3 of the free magnetic layer 5 so as to tilt the variable magnetization Hf3 towards the combined magnetization moment, that is, the current magnetic field Hi3 (opposite to the Y direction), as shown by the direction Hfc in FIG. 9.

In contrast, the current magnetic field BHi10 affects the variable magnetization Hf3 of the free magnetic layer 5 so as to tilt the variable magnetization Hf3 towards a direction (Y direction) opposite to the combined magnetization moment of the magnetostatic coupling magnetic field Hp3 and the current magnetic field Hi3 of the detecting current i3. As a result, the combined magnetization moment affecting the variable magnetization Hf3 is compensated for by the current magnetic field BHi10 from the biasing conductive layer B31. Accordingly, the variable magnetization Hf3 of the free magnetic layer 5 is oriented in a direction opposite to the X1 direction without tilting towards the combined magnetization moment.

As described above, the current Bi10 applied to the biasing conductive layer B31 forms the current magnetic field BHi10 that is opposite to and compensates for the combined magnetization moment of the magnetostatic coupling magnetic field Hp3 of the pinned magnetic layer 23 and the current magnetic field Hi3 of the detecting current i3. Thus, the variable magnetization Hf3 of the free magnetic layer 5 is oriented in a direction perpendicular to the pinned magnetization P3 of the pinned magnetic layer 23. The resulting spin-valve thin-film element exhibits high thermal resistance, superior reliability, and small asymmetry.

Eighth Embodiment

Figure 10:
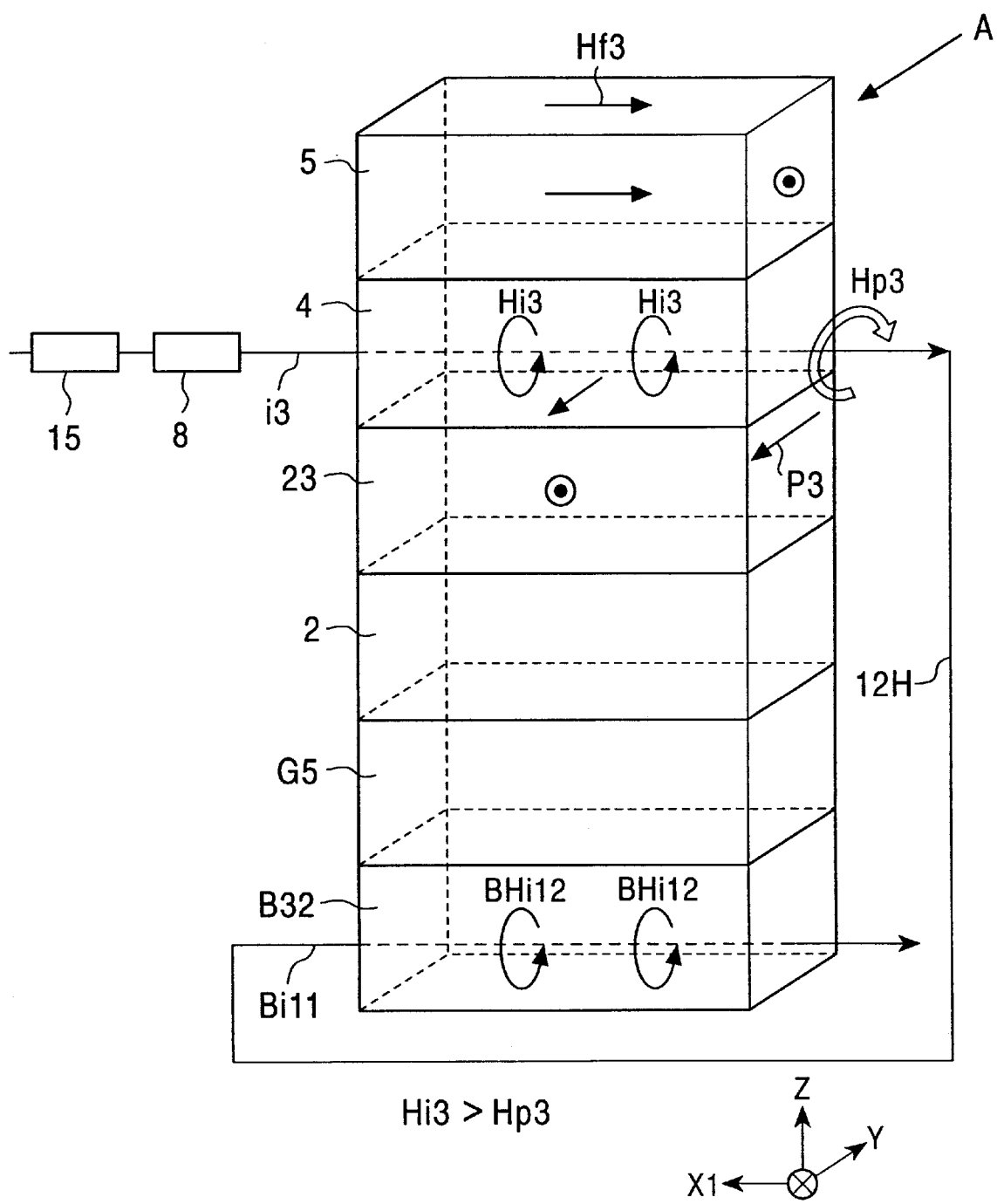
FIG. 10 is a schematic view illustrating magnetization directions of a pinned magnetic layer, a nonmagnetic conductive layer, a free magnetic layer, and a biasing conductive layer of a spin-valve thin-film element in accordance with an eighth embodiment of the present invention.

FIG. 10 is a schematic view illustrating magnetization directions of a pinned magnetic layer, a nonmagnetic conductive layer, a free magnetic layer, and a biasing conductive layer of a spin-valve thin-film element in accordance with an eighth embodiment, as a modification of the seventh embodiment of the present invention.

In the spin-valve thin-film element of the eighth embodiment, a biasing conductive layer B32 is provided below an antiferromagnetic layer 2 with an insulating layer G5 therebetween, away from a pinned magnetic layer 23.

A conductive layer 8, a nonmagnetic conductive layer 4, a conductor 12H and the biasing conductive layer B32 are connected in series, and currents having the same direction are supplied to the nonmagnetic conductive layer 4 and the biasing conductive layer B32 from a current supply unit 15 via the conductive layer 8.

A current Bi11 supplied to the biasing conductive layer B32 controls the direction of a variable magnetization Hf3 of a free magnetic layer 5. That is, the current Bi11 in the biasing conductive layer B32 forms a current magnetic field BHi11 that is opposite to and compensates for a combined magnetization moment of a magnetostatic coupling magnetic field Hp3 of the pinned magnetic layer 23 and a current magnetic field Hi3 of a detecting current i3. Thus, the variable magnetization Hf3 of the free magnetic layer 5 is oriented in a direction perpendicular to a pinned magnetization P3 of the pinned magnetic layer 23.

Moreover, the insulating layer G5 provided between the antiferromagnetic layer 2 and the biasing conductive layer B32 can prevent shunt loss in the spin-valve thin-film element.

Ninth Embodiment

Figure 11:
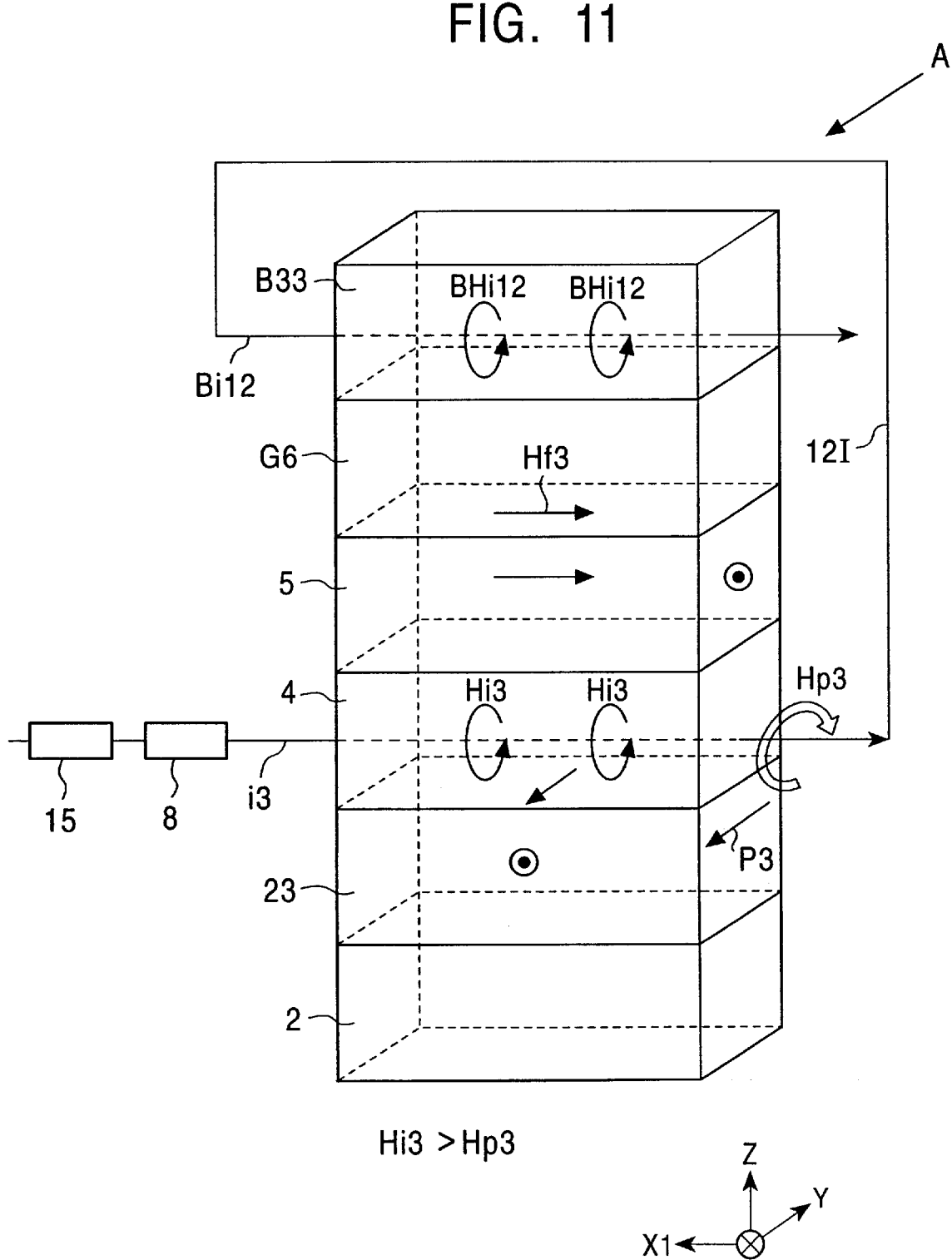
FIG. 11 is a schematic view illustrating magnetization directions of a pinned magnetic layer, a nonmagnetic conductive layer, a free magnetic layer, and a biasing conductive layer of a spin-valve thin-film element in accordance with a ninth embodiment of the present invention.

FIG. 11 is a schematic view illustrating magnetization directions of a pinned magnetic layer, a nonmagnetic conductive layer, a free magnetic layer, and a biasing conductive layer of a spin-valve thin-film element in accordance with a ninth embodiment, as another modification of the seventh embodiment of the present invention.

The spin-valve thin-film element of the ninth embodiment differs from that of the seventh embodiment in that an insulating layer G6 is provided between a biasing conductive layer B33 and a free magnetic layer 5.

A current Bi12 supplied to the biasing conductive layer B33 controls the direction of a variable magnetization Hf3 of the free magnetic layer 5. That is, the current Bi12 in the biasing conductive layer B33 forms a current magnetic field BHi12 that is opposite to and compensates for a combined magnetization moment of a magnetostatic coupling magnetic field Hp3 of a pinned magnetic layer 23 and a current magnetic field Hi3 of a detecting current i3. Thus, the variable magnetization Hf3 of the free magnetic layer 5 is oriented in a direction perpendicular to a pinned magnetization P3 of the pinned magnetic layer 23.

Moreover, the insulating layer G6 provided between the biasing conductive layer B33 and the free magnetic layer 5 can prevent shunt loss in the spin-valve thin-film element.

Tenth Embodiment

Figure 17:
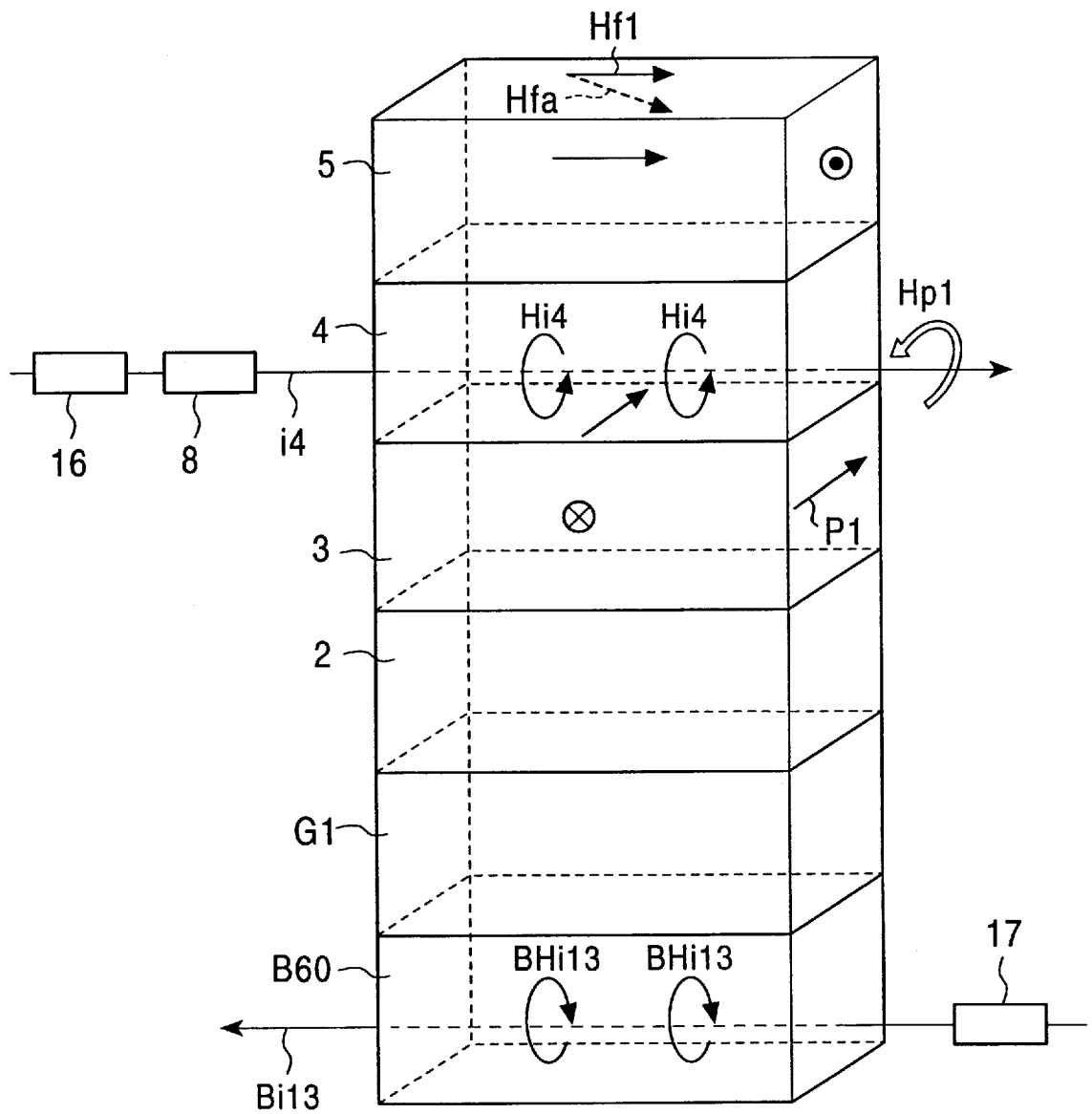
FIG. 17 is a schematic view illustrating magnetization directions of a pinned magnetic layer, a nonmagnetic conductive layer, a free magnetic layer, and a biasing conductive layer of a spin-valve thin-film element in accordance with a tenth embodiment of the present invention.

FIG. 17 is a schematic view illustrating magnetization directions of a pinned magnetic layer, a nonmagnetic conductive layer, a free magnetic layer, and a biasing conductive layer of a spin-valve thin-film element in accordance with a tenth embodiment, as a modification of the second embodiment shown in FIG. 4.

The spin-valve thin-film element of the tenth embodiment differs from that of the second embodiment in that a detecting current i4 supplied from a conductive layer 8 to the free magnetic layer 5, the nonmagnetic conductive layer 4, the pinned magnetic layer 3, and the antiferromagnetic layer 2 and a current Bi13 applied to a biasing conductive layer B60 are supplied from different current supply units 16 and 17, respectively.

The current Bi13 in the biasing conductive layer B60 can control the direction of a variable magnetization Hf1 of a free magnetic layer 5. That is, the current Bi13 in the biasing conductive layer B60 forms a current magnetic field BHi13 that is opposite to and compensates for a combined magnetization moment of a magnetostatic coupling magnetic field Hp1 of a pinned magnetic layer 3 and a current magnetic field Hi4 of a detecting current i4. Thus, the variable magnetization Hf1 of the free magnetic layer 5 is oriented in a direction perpendicular to a pinned magnetization P1 of the pinned magnetic layer 3.

As described above, in this embodiment, the current Bi13 and the current magnetic field Hi4 are supplied from different current supply units 16 and 17, respectively. Thus, both a current having the same direction as or a current having the opposite direction to the current magnetic field Hi4 can be applied to the biasing conductive layer B60 using the same connection between the biasing conductive layer B60 and the current supply unit 17. That is, the direction of the current applied to the biasing conductive layer B60 is not limited regardless of the current magnetic field Hi4.

Moreover, the intensity of the current Bi13 in the biasing conductive layer B60 can be controlled without affecting the intensity of the current magnetic field Hi4. Thus, the tilt of the variable magnetization Hf1 of the free magnetic layer 5 due to the magnetostatic coupling magnetic field Hp1 of the pinned magnetic layer 3 and the current magnetic field Hi4 of the detecting current i4 can be more readily controlled.

Eleventh Embodiment

Figure 12:
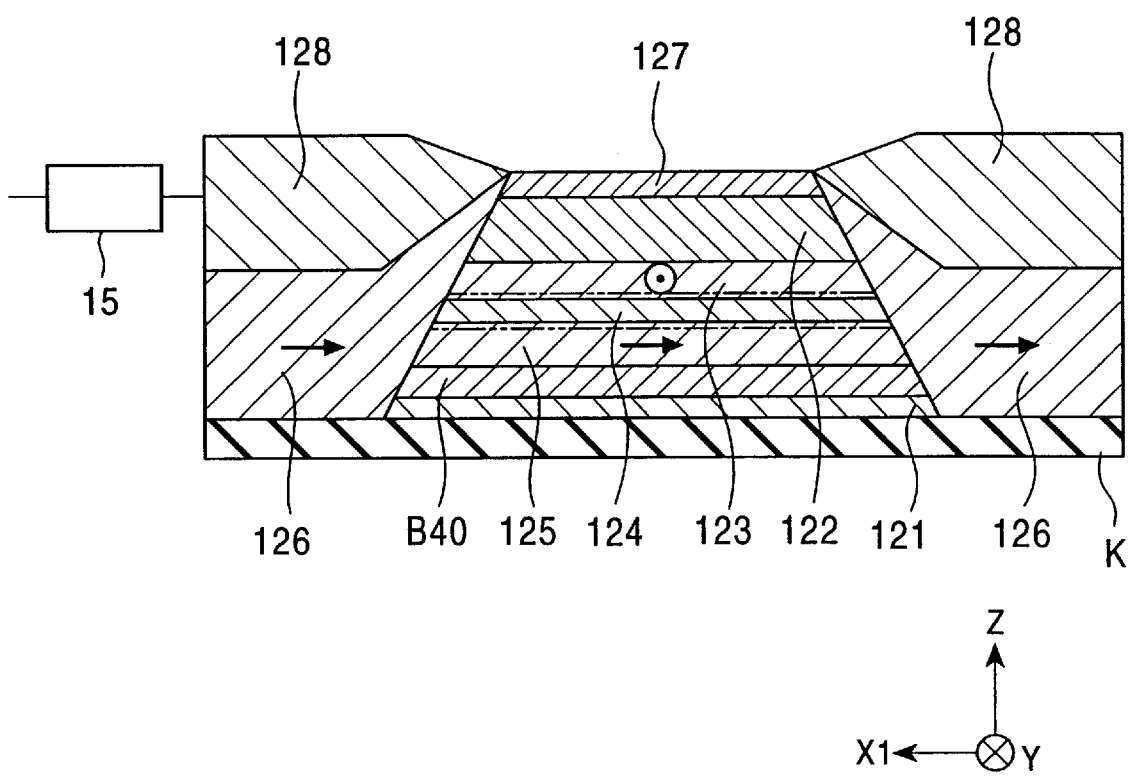
FIG. 12 is a cross-sectional view of a spin-valve thin-film element in accordance with an eleventh embodiment of the present invention, viewed from a face opposing a recording medium.

FIG. 12 is a cross-sectional view of a spin-valve thin-film element in accordance with an eleventh embodiment of the present invention, viewed from a face opposing a recording medium.

The spin-valve thin-film element of the eleventh embodiment is a top-type single spin-valve thin-film element in which the layer configuration is reversed compared to the configuration of the first embodiment shown in FIG. 1. Moreover, the magnetization direction of the pinned magnetic layer is opposite to that in the spin-valve thin-film element shown in FIG. 1.

In this spin-valve thin-film element, a magnetic recording medium, such as a hard disk, moves in the Z direction and a fringing magnetic field is generated from the magnetic recording medium in the Y direction in these drawings.

With reference to FIG. 12, an underlying layer 121 is formed on a substrate K. A biasing conductive layer B40 is formed on the underlying layer 121, and a free magnetic layer 125 is formed on the biasing conductive layer B40. A nonmagnetic conductive layer 124 is formed on the free magnetic layer 125, and a pinned magnetic layer 123 is formed on the nonmagnetic conductive layer 124. An antiferromagnetic layer 122 is formed on the pinned magnetic layer 123, and a protective layer 127 is formed on the antiferromagnetic layer 122. Hard biasing layers 126 and conductive layers 128 are formed on both sides of a composite of the above layers. Numeral 15 represents a current supply unit.

It is preferable that the conductive layers 128 be connected in series to the biasing conductive layer B40 via a conductor. The magnetization direction of the pinned magnetic layer 123 is fixed in a direction opposite to the Y direction.

The underlying layer 121, the biasing conductive layer B40, the free magnetic layer 125, the nonmagnetic conductive layer 124, the pinned magnetic layer 123, the hard biasing layers 126, the protective layer 127, and the conductive layers 128 may be formed of the same materials as in the first embodiment. The antiferromagnetic layer 122 can be composed of substantially the same material as that in the first embodiment. The optimum composition for achieving a satisfactory exchange coupling magnetic field is, however, slightly different from that in the first embodiment.

In the X—Mn alloy constituting the antiferromagnetic layer 122, the Mn content is in a range of preferably 37 to 63 atomic percent, and more preferably 42 to 47 atomic percent in order to achieve an exchange coupling magnetic field of at least 500 Oe.

In the X'—Pt—Mn alloy, the Mn content is in a range of preferably 37 to 63 atomic percent, and more preferably 42 to 47 atomic percent in order to achieve an exchange coupling magnetic field of at least 500 Oe.

Since the spin-valve thin-film element of this embodiment has the biasing conductive layer B40, a current applied to the biasing conductive layer B40 can control the direction of the variable magnetization of the free magnetic layer 125.

In the case in that the pinned magnetization of the pinned magnetic layer 123 is formed in a direction opposite to the Y direction and the magnetostatic coupling magnetic field of the pinned magnetic layer 123 and the current magnetic field of the detecting current are formed in the same direction (assisting direction), when a current having the same direction as that of the detecting current is applied to the biasing conductive layer B40, a current magnetic field which is opposite to the magnetostatic coupling magnetic field and the current magnetic field of the detecting current is formed. That is, the current applied to the biasing conductive layer B40 forms a current magnetic field, which is opposite to and compensates for a combined magnetization moment of the magnetostatic coupling magnetic field of the pinned magnetic layer 123 and the current magnetic field of the detecting current. Accordingly, the variable magnetization of the free magnetic layer 125 can be oriented in a direction perpendicular to the pinned magnetization of the pinned magnetic layer 123. The resulting spin-valve thin-film element exhibits high thermal resistance, superior reliability, and reduced asymmetry.

The layer configuration of the top-type spin-valve thin-film element shown in FIG. 12 is the reverse in the Z direction to the layer configuration of the bottom-type spin-valve thin-film element of the first embodiment, when viewed from along the arrow A shown in FIG. 2.

An insulating layer may be formed between the free magnetic layer 125 and the biasing conductive layer B40, as in the third embodiment shown in FIG. 5. Alternatively, the insulating layer may be formed between the biasing conductive layer B40 and the antiferromagnetic layer 122, as in the second embodiment shown in FIG. 4.

When the magnetostatic coupling magnetic field of the pinned magnetic layer 123 and the current magnetic field of the detecting current are formed in different directions (counter directions) and when the magnetostatic coupling magnetic field is larger than the current magnetic field, a current having the same direction as that of the detecting current is applied to form a current magnetic field in a direction opposite to the magnetostatic coupling magnetic field.

The embodiments of this top-type single spin-valve thin-film element are represented by schematic views in which the layer configurations are the reverse in the Z direction to the embodiments of the bottom-type single spin-valve thin-film element shown in the schematic views shown in FIG. 6 for the fourth embodiment, FIG. 7 for the fifth embodiment, and FIG. 8 for the sixth embodiment.

When the magnetostatic coupling magnetic field of the pinned magnetic layer 123 and the current magnetic field of the detecting current are formed in different directions (counter directions), and when the magnetostatic coupling magnetic field is smaller than the current magnetic field, a current, opposing the detecting current by 180 degrees, is applied to the biasing conductive layer B40 to form a current magnetic field which is opposite to the current magnetic field of the detecting current.

The embodiments of this top-type single spin-valve thin-film element are represented by schematic views in which the layer configurations are the reverse in the Z direction to the embodiments of the bottom-type single spin-valve thin-film element shown in the schematic views shown in FIG. 9 for the seventh embodiment, FIG. 10 for the eighth embodiment, and FIG. 11 for the ninth embodiment.

A current applied to the biasing conductive layer B40 forms a current magnetic field, which is opposite to and compensates for a combined magnetization moment of the magnetostatic coupling magnetic field of the pinned magnetic layer 123 and the current magnetic field of the detecting current. Accordingly, the variable magnetization of the free magnetic layer 125 can be oriented in a direction perpendicular to the pinned magnetization of the pinned magnetic layer 123. The resulting spin-valve thin-film element exhibits high thermal resistance, superior reliability, and reduced asymmetry.

When an insulating film is provided between the antiferromagnetic layer 122 and the biasing conductive layer B40 or between the free magnetic layer 125 and biasing conductive layer B40, the spin-valve thin-film element can prevent shunt loss.

When the biasing conductive layer B40 and the conductive layer 128 are connected in series to each other, both the current applied to the conductive layer 128 and the current applied to the biasing conductive layer B40 can be supplied from the current supply unit 15. Thus, the spin-valve thin-film element can be readily formed.

In the top-type single spin-valve thin-film element shown in FIG. 12, the biasing conductive layer B40 is formed on the surface away from the nonmagnetic conductive layer 124 of the free magnetic layer 125. The biasing conductive layer B40 may be formed on the surface away from the pinned magnetic layer 123 of the antiferromagnetic layer 122.

When a current having the same direction as that of the detecting current is applied to the biasing conductive layer B40, the spin-valve thin-film element may have a structure in which the biasing conductive layer B40 is in contact with the antiferromagnetic layer 122. In this structure, no conductive layer for applying the current to the biasing conductive layer B40 is necessary. Thus, the spin-valve thin-film element can be readily formed.

When the biasing conductive layer B40 is provided on the surface of the free magnetic layer 125 away from the nonmagnetic conductive layer 124, an insulating layer may be provided between the biasing conductive layer B40 and the free magnetic layer 125. By the insulating layer provided between the biasing conductive layer B40 and the free magnetic layer 125, the conductive layer 128 and the biasing conductive layer B40 may be connected in series or may be connected to different circuits.

The biasing conductive layer B40 and the conductive layer 128 may be connected to different current supply units. In such a configuration, there is no difference in connection of the biasing conductive layer B40 to the current supply unit when a current is applied in the same direction as the detecting current and when a current is applied in the opposite direction to the detecting current. Accordingly, the direction of the current applied to the nonmagnetic conductive layer 124 can be selected without restriction regardless of the direction of the detecting current.

The intensity of the current in the biasing conductive layer B40 can be controlled without restriction while the intensity of the detecting current is not affected. Thus, the tilt of the variable magnetization of the free magnetic layer 125 due to the magnetostatic coupling magnetic field of the pinned magnetic layer 123 and the current magnetic field of the detecting current can be controlled over a wide range.

Twelfth Embodiment

Figure 13:
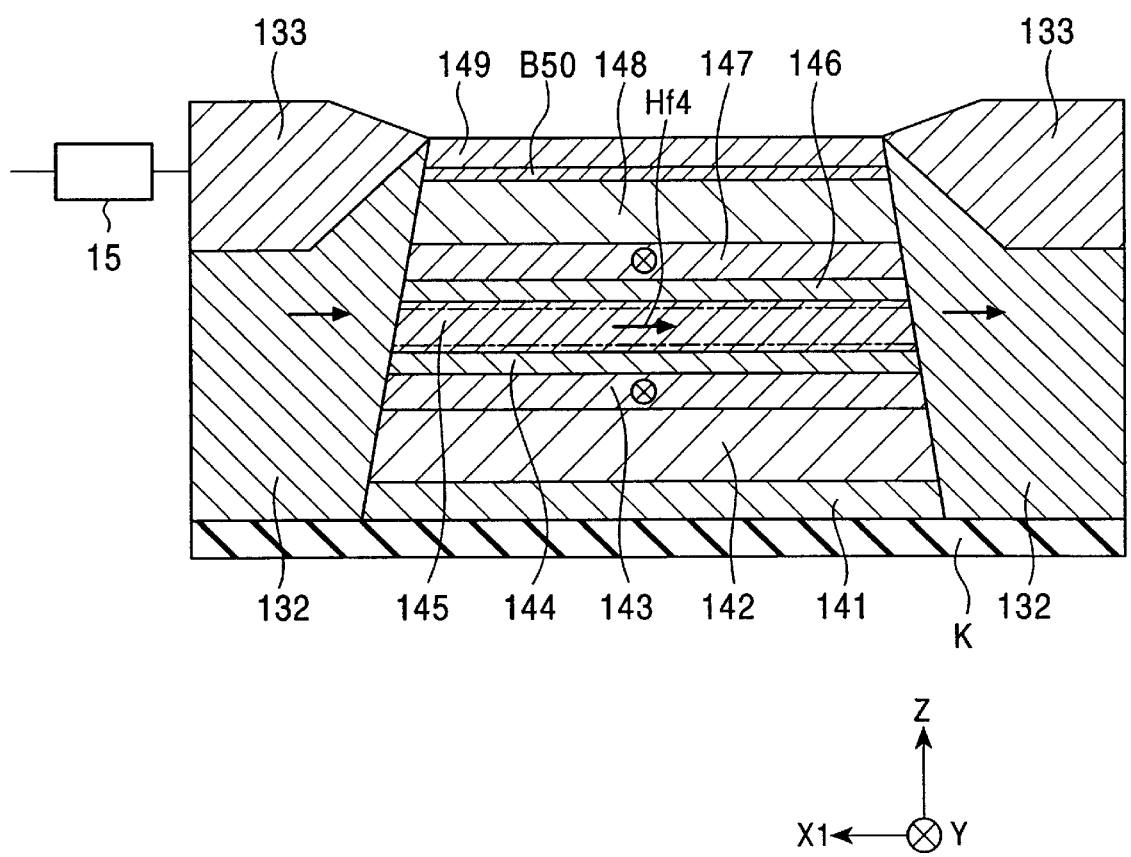
FIG. 13 is a cross-sectional view of a spin-valve thin-film element in accordance with a twelfth embodiment of the present invention, viewed from a face opposing a recording medium.

FIG. 13 is a cross-sectional view of a spin-valve thin-film element in accordance with a twelfth embodiment of the present invention, viewed from a face opposing a recording medium.

The spin-valve thin-film element in accordance with this embodiment is a dual spin-valve thin-film element in which a nonmagnetic conductive layer, a pinned magnetic layer, and an antiferromagnetic layer are formed on each surface of a free magnetic layer. This arrangement forms a spin-valve thin-film element with a dual structure. In FIG. 13, a magnetic recording medium, such as a hard disk, moves in the Z direction and generates a fringing magnetic field in the Y direction.

With reference to FIG. 13, an underlying layer 141, an antiferromagnetic layer 142, a lower pinned magnetic layer 143, a nonmagnetic conductive layer 144, a free magnetic layer 145, a nonmagnetic conductive layer 146, an upper pinned magnetic layer 147, an antiferromagnetic layer 148, a biasing conductive layer B50, and a protective layer 149 are deposited in that order on a substrate K.

Hard biasing layers 132 and conductive layers 133 are formed on both sides of the composite from the underlying layer 141 to the protective layer 149. Numeral 15 represents a current supply unit.

Figure 14:
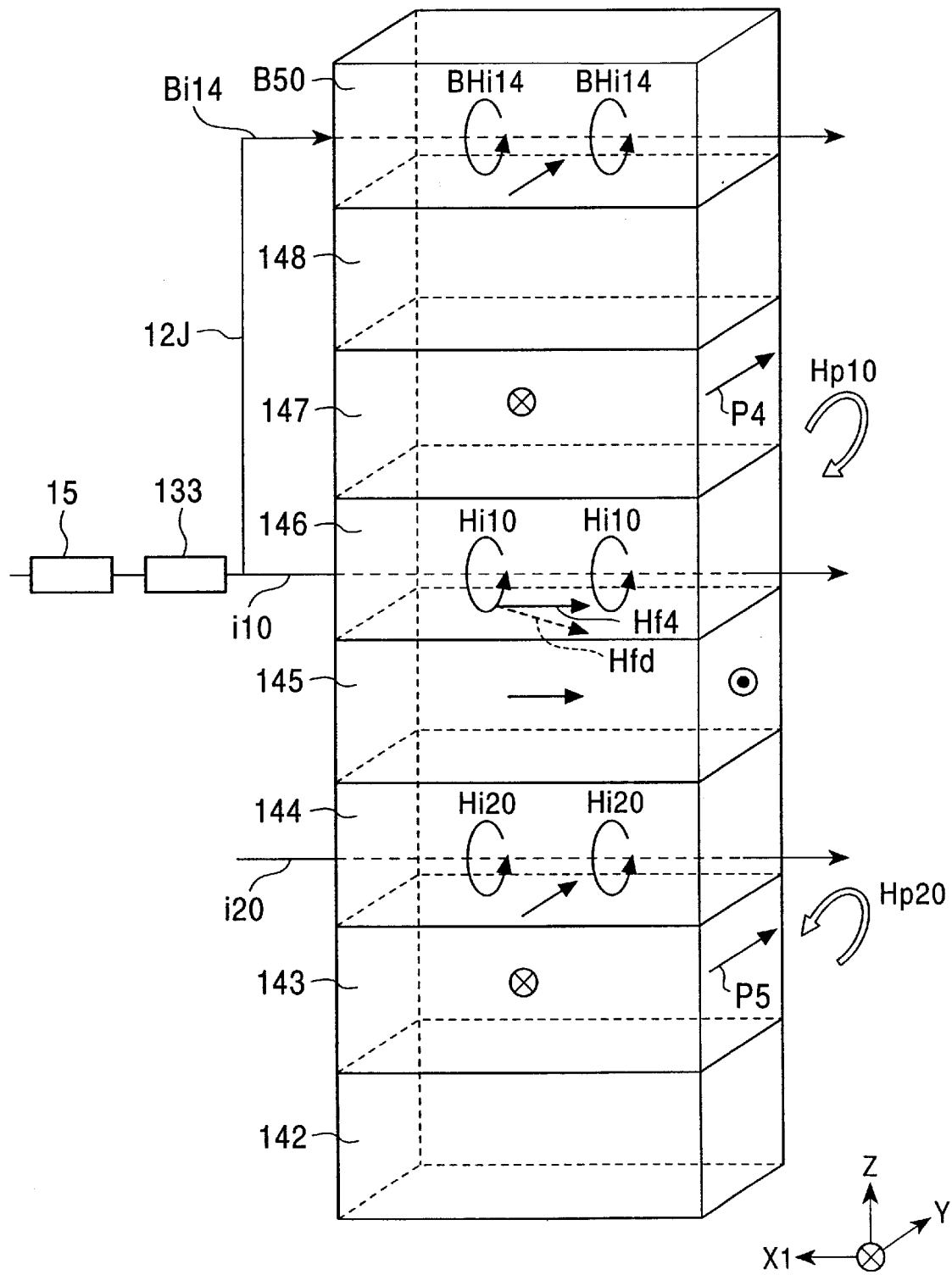
FIG. 14 is a schematic view illustrating magnetization directions of pinned magnetic layers, nonmagnetic conductive layers, a free magnetic layer, and a biasing conductive layer of the spin-valve thin-film element shown in FIG. 13.

With reference to FIG. 14, the conductive layer 133 and the biasing conductive layer B50 are connected in series so that currents having the same directions are predominantly supplied to the nonmagnetic conductive layer 146 and the biasing conductive layer B50 which are more conductive compared to other layers.

The underlying layer 141, the free magnetic layer 145, the nonmagnetic conductive layers 144 and 146, the lower and upper pinned magnetic layers 143 and 147, respectively, the biasing conductive layer B50, the antiferromagnetic layers 142 and 148, the hard biasing layers 132, the protective layer 149, and the conductive layers 133 are formed of the same materials as those in the above embodiments.

Since the lower pinned magnetic layer 143 and the upper pinned magnetic layer 147 are in contact with the antiferromagnetic layer 142 and the antiferromagnetic layer 148, respectively, exchange coupling magnetic fields (exchange anisotropic magnetic fields) are generated at the interfaces between the lower pinned magnetic layer 143 and the antiferromagnetic layer 142 and between the upper pinned magnetic layer 147 and the antiferromagnetic layer 148, and the pinned magnetization of the lower pinned magnetic layer 143 and the pinned magnetization of the upper pinned magnetic layer 147 are fixed, for example, in the Y direction.

Since the hard biasing layers 132 are magnetized in a direction opposite to the X1 direction, the variable magnetization of the free magnetic layer 145 is oriented in a direction opposite to the X1 direction. Thus, as shown in FIGS. 13 and 14, a variable magnetization Hf4 of the free magnetic layer 145 is perpendicular to a pinned magnetization P4 of the lower pinned magnetic layer 143 and a pinned magnetization P5 of the upper pinned magnetic layer 147.

With reference to FIG. 14, a magnetostatic coupling magnetic field Hp20 of the lower pinned magnetic layer 143 and a magnetostatic coupling magnetic field Hp10 of the upper pinned magnetic layer 147 are formed in the same direction (Y direction) with respect to the variable magnetization Hf4 of the free magnetic layer 145.

Detecting currents i10 and i20 flow in a direction opposite to the X1 direction. A current magnetic field Hi10 of the detecting current i10 and a current magnetic field Hi20 of the detecting current i20 are formed in different directions with respect to the variable magnetization Hf4 of the free magnetic layer 145.

A current Bi14 is applied to the biasing conductive layer B50 in a direction opposite to the X1 direction. Thus, the current magnetic field BHi14 is generated in a direction (Y direction) opposite to the magnetostatic coupling magnetic field Hp10 of the upper pinned magnetic layer 147 and the magnetostatic coupling magnetic field Hp20 of the lower pinned magnetic layer 143 with respect to the variable magnetization Hf4.

It is preferable that the current magnetic field BHi14 affecting the variable magnetization Hf4 of the free magnetic layer 145 be substantially equal to a combined magnetization moment of the magnetostatic coupling magnetic field Hp20 of the lower pinned magnetic layer 143 and the magnetostatic coupling magnetic field Hp10 of the upper pinned magnetic layer 147 which affect the variable magnetization Hf4.

It is preferable that the intensity of the current magnetic field BHi14 from the biasing conductive layer B50 be controlled by the intensity of the current Bi14 applied to the biasing conductive layer B50.

The conductive layer 133 and the biasing conductive layer B50 are connected in series and the detecting current i10 from the conductive layer 133 and the current Bi14 in the biasing conductive layer B50 are supplied from the same current supply unit 15.

The material for the conductor and the current supply unit 15 used in the above embodiments can also be used in a conductor 12J and the current supply unit 15 in the spin-valve thin-film element of this embodiment.

The fringing magnetic field from the magnetic recording medium such as a hard disk varies the variable magnetization Hf4 of the free magnetic layer 145 oriented in a direction opposite to the X1 direction. Thus, the electrical resistance of the spin-valve thin-film element varies according to the pinned magnetization P5 of the lower pinned magnetic layer 143 and the pinned magnetization P4 of the upper pinned magnetic layer 147 which are fixed in the Y direction. As a result, the fringing magnetic field from the magnetic recording medium can be detected as a change in voltage due to the change in the electrical resistance.

The current Bi14 applied to the biasing conductive layer B50 can control the direction of the variable magnetization Hf4 of the free magnetic layer 145.

The relationships between the variable magnetization Hf4 of the free magnetic layer 145, the magnetostatic coupling magnetic field Hp20 of the lower pinned magnetic layer 143, the magnetostatic coupling magnetic field Hp10 of the upper pinned magnetic layer 147, the current magnetic field Hi10 of the detecting current i10, the current magnetic field Hi20 of the detecting current i20, and the current magnetic field BHi14 from the biasing conductive layer B50 will now be described in detail.

The direction of the variable magnetization Hf4 of the free magnetic layer 145 depends on the fringing magnetic field from the magnetic recording medium, the magnetostatic coupling magnetic field Hp10 of the lower pinned magnetic layer 143, the magnetostatic coupling magnetic field Hp20 of the upper pinned magnetic layer 147, the current magnetic field Hi10 of the detecting current i10, and the current magnetic field Hi20 of the detecting current i20, and the current magnetic field BHi14 from the biasing conductive layer B50.

The magnetostatic coupling magnetic field Hp20 of the lower pinned magnetic layer 143 and the magnetostatic coupling magnetic field Hp10 of the upper pinned magnetic layer 147 affect the variable magnetization Hf4 of the free magnetic layer 145 so as to tilt the variable magnetization Hf4 towards the magnetostatic coupling magnetic field Hp10 and the magnetostatic coupling magnetic field Hp20 (a direction opposite to the Y direction), as shown by the arrow Hfd in FIG. 14.

The current magnetic field Hi10 of the detecting current i10 and the current magnetic field Hi20 of the detecting current i20 are generated in opposite directions with respect to the variable magnetization Hf4 and thus are cancelled. Thus, these current magnetic fields do not affect the variable magnetization Hf4 of the free magnetic layer 145.

The current magnetic field BHi14 from the biasing conductive layer B50 affects the variable magnetization Hf4 of the free magnetic layer 145 so as to tilt the variable magnetization Hf4 towards a direction (Y direction) opposite to the magnetostatic coupling magnetic field Hp10 and the magnetostatic coupling magnetic field Hp20. Thus, a combined magnetization moment of the magnetostatic coupling magnetic field Hp10 and the magnetostatic coupling magnetic field Hp20 is compensated for by the current magnetic field BHi14 from the biasing conductive layer B50. Accordingly, the variable magnetization Hf4 of the free magnetic layer 145 is oriented in a direction opposite to the X1 direction without tilting towards the magnetostatic coupling magnetic field Hp10 and the magnetostatic coupling magnetic field Hp20.

The current Bi14 applied to the biasing conductive layer B50 generates the current magnetic field BHi14 that is opposite to and compensates for the combined magnetization moment of the magnetostatic coupling magnetic field Hp20 of the lower pinned magnetic layer 143 and the magnetostatic coupling magnetic field Hp10 of the upper pinned magnetic layer 147. As a result, the variable magnetization Hf4 of the free magnetic layer 145 is oriented in a direction perpendicular to the pinned magnetization P5 of the lower pinned magnetic layer 143 and the pinned magnetization P4 of the upper pinned magnetic layer 147. As a result, the spin-valve thin-film element exhibits high thermal resistance, superior reliability, and reduced asymmetry.

Since the current magnetic field BHi14 from the biasing conductive layer B50 is substantially equal to the combined magnetization moment of the magnetostatic coupling magnetic field Hp10 and the magnetostatic coupling magnetic field Hp20, the biasing conductive layer B50 can compensate the combined magnetization moment affecting the variable magnetization Hf4 of the free magnetic layer 145 and can prevent tilting of the variable magnetization Hf4 towards the current magnetic field BHi14 which will occur when the current magnetic field BHi14 from the biasing conductive layer B50 is large.

Accordingly, the variable magnetization Hf4 of the free magnetic layer 145 can be securely oriented in a direction perpendicular to the pinned magnetization P5 of the lower pinned magnetic layer 143 and the pinned magnetization P4 of the upper pinned magnetic layer 147.

When the intensity of the current magnetic field BHi14 from the biasing conductive layer B50 is controlled by the intensity of the current Bi14 applied to the biasing conductive layer B50, the current magnetic field BHi14 from the biasing conductive layer B50 can be readily equalized to the combined magnetization moment affecting the variable magnetization Hf4 of the free magnetic layer 145. As a result, the variable magnetization Hf4 of the free magnetic layer 145 can be readily oriented in a direction perpendicular to the pinned magnetization P4 of the lower pinned magnetic layer 143 and the pinned magnetization P5 of the upper pinned magnetic layer 147.

Since the biasing conductive layer B50 and the conductive layer 133 are connected in series, one current supply unit 15 can supply both the detecting current i10 to the nonmagnetic conductive layer 146 and the current Bi14 to the biasing conductive layer B50 via the conductive layer 133. Thus, the spin-valve thin-film element not having an additional current supply unit can be readily produced.

In the dual spin-valve thin-film element, the nonmagnetic conductive layers 144 and 146, the lower and upper pinned magnetic layer 143 and 147, and the antiferromagnetic layers 142 and 148 are formed on the lower face and the upper face, respectively, of the free magnetic layer 145. That is, the dual spin-valve thin-film element includes two groups of triple-layer configurations of free magnetic layer/nonmagnetic conductive layer/pinned magnetic layer, and produces a large ΔMR (a rate of change in resistance) compared to single spin-valve thin-film elements. Thus, the dual spin-valve thin-film element is suitable for high-density recording.

Since the biasing conductive layer B50 is in contact with the antiferromagnetic layer 148, no additional current supply unit is necessary. Thus, the spin-valve thin-film element can be readily produced.

In the spin-valve thin-film element of the twelfth embodiment, the biasing conductive layer B50 and the conductive layer 133 may be connected to different current supply units. In such a configuration, the connection between the biasing conductive layer B50 and the current supply unit can be readily performed when the current Bi14 is applied in a direction which is the same as or different from that of the detecting current i10 and the detecting current i20.

Thus, the direction of the current applied to the biasing conductive layer B50 can be determined regardless of the detecting current i10 and the detecting current i20.

Moreover, the intensity of the current in the biasing conductive layer B50 can be controlled without restriction by a change in thickness of the biasing conductive layer B50 while the intensities of the detecting current i10 and the detecting current i20 are not affected. Thus, the variable magnetization Hf4 of the free magnetic layer 125 due to the magnetostatic coupling magnetic field Hp20 of the lower pinned magnetic layer 143 and the magnetostatic coupling magnetic field Hp10 of the upper pinned magnetic layer 147 can be controlled.

Thirteenth Embodiment

Figure 15:
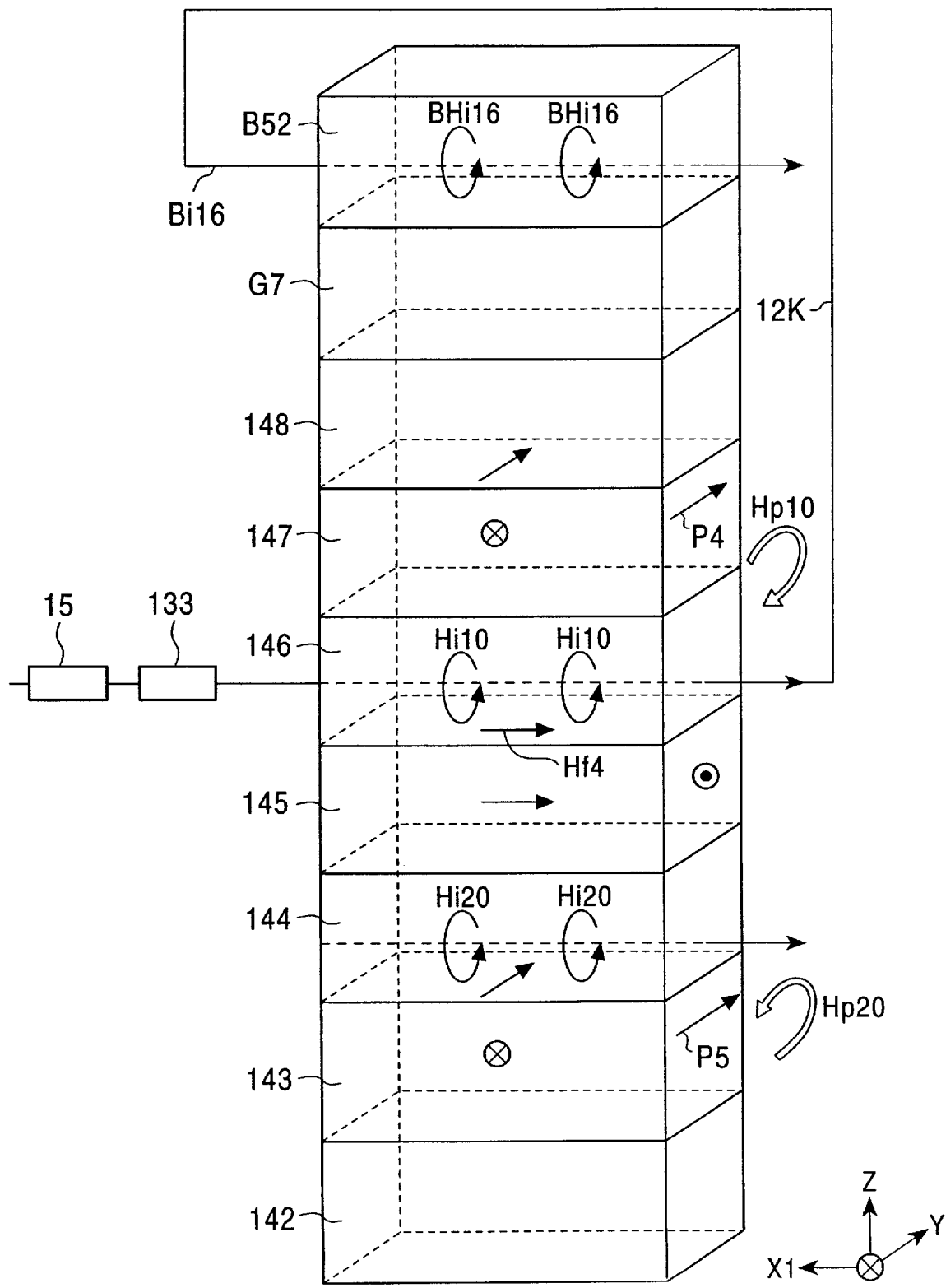
FIG. 15 is a schematic view illustrating magnetization directions of pinned magnetic layers, nonmagnetic conductive layers, a free magnetic layer, and a biasing conductive layer of a spin-valve thin-film element in accordance with a thirteenth embodiment of the present invention.

FIG. 15 is a schematic view illustrating magnetization directions of pinned magnetic layers, nonmagnetic conductive layers, a free magnetic layer, and a biasing conductive layer of a spin-valve thin-film element in accordance with a thirteenth embodiment of the present invention.

The spin-valve thin-film element of the thirteenth embodiment differs from that of the twelfth embodiment shown in FIG. 14 in that an insulating layer G7 is provided between an antiferromagnetic layer 148 and a biasing conductive layer B52, as shown in FIG. 15.

In the spin-valve thin-film element of the thirteenth embodiment, a conductive layer 133 and the biasing conductive layer B52 are connected in series via a conductor 12K. The current supply unit 15 supplies currents having the same direction to a nonmagnetic conductive layer 146 and the biasing conductive layer B52 via the conductive layer 133.

A current Bi16 supplied to the biasing conductive layer B52 can control the direction of a variable magnetization Hf4 of a free magnetic layer 145. That is, the current Bi16 forms a current magnetic field BHi16 which is opposite to a combined magnetization moment of a magnetostatic coupling magnetic field Hp10 of an upper pinned magnetic layer 147 and a magnetostatic coupling magnetic field Hp20 of a lower pinned magnetic layer 143, and compensates for the combined magnetization moment affecting the variable magnetization Hf4 of the free magnetic layer 145. As a result, the variable magnetization Hf4 of the free magnetic layer 145 can be oriented in a direction that is perpendicular to a pinned magnetization P5 of the lower pinned magnetic layer 143 and a pinned magnetization P4 of the upper pinned magnetic layer 147.

The insulating layer G7 provided between the antiferromagnetic layer 148 and the biasing conductive layer B52 can prevent shunt loss in the spin-valve thin-film element.

Fourteenth Embodiment

Figure 16:
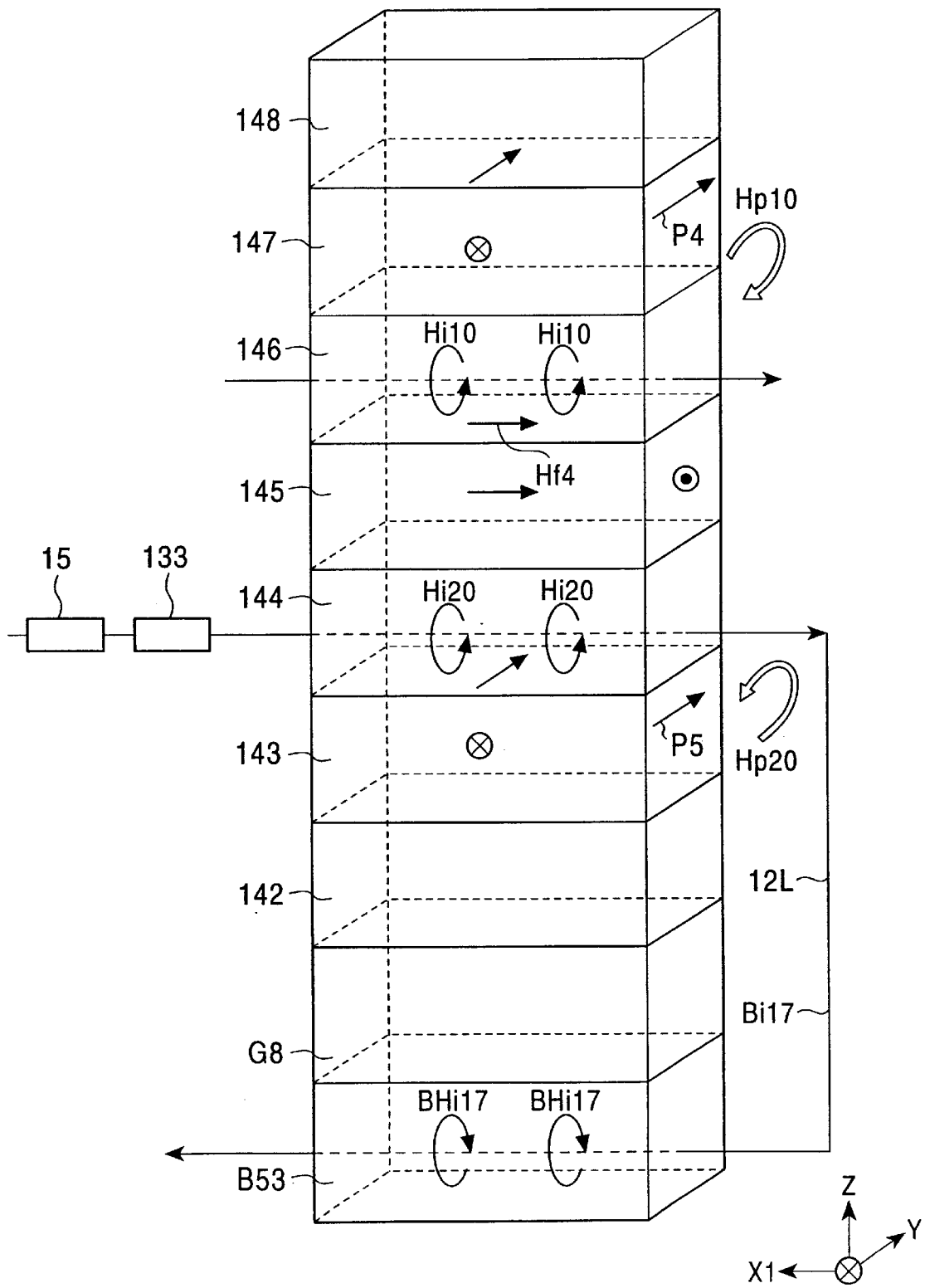
FIG. 16 is a schematic view illustrating magnetization directions of pinned magnetic layers, nonmagnetic conductive layers, a free magnetic layer, and a biasing conductive layer of a spin-valve thin-film element in accordance with a fourteenth embodiment of the present invention.

FIG. 16 is a schematic view illustrating magnetization directions of pinned magnetic layers, nonmagnetic conductive layers, a free magnetic layer, and a biasing conductive layer of a spin-valve thin-film element in accordance with a fourteenth embodiment of the present invention.

The spin-valve thin-film element of the fourteenth embodiment differs from that of the twelfth embodiment shown in FIG. 14 in that an insulating layer G8 is provided under an antiferromagnetic layer 142 and a biasing conductive layer B53 is provided under the insulating layer G8, as shown in FIG. 16.

In the spin-valve thin-film element of the fourteenth embodiment, a conductive layer 133 and the biasing conductive layer B53 are connected in series via a conductor 12L. The current supply unit 15 supplies currents having directions opposing by 180 degrees to a nonmagnetic conductive layer 144 and the biasing conductive layer B53 via the conductive layer 133.

A current Bi17 supplied to the biasing conductive layer B53 can control the direction of a variable magnetization Hf4 of a free magnetic layer 145. That is, the current Bi17 forms a current magnetic field BHi17 which is opposite to a combined magnetization moment of a magnetostatic coupling magnetic field Hp10 of an upper pinned magnetic layer 147 and a magnetostatic coupling magnetic field Hp20 of a lower pinned magnetic layer 143, and compensates for the combined magnetization moment affecting the variable magnetization Hf4 of the free magnetic layer 145. As a result, the variable magnetization Hf4 of the free magnetic layer 145 can be oriented in a direction that is perpendicular to a pinned magnetization P5 of the lower pinned magnetic layer 143 and a pinned magnetization P4 of the upper pinned magnetic layer 147.

The insulating layer G8 provided between the biasing conductive layer B53 and the antiferromagnetic layer 142 can prevent shunt loss in the spin-valve thin-film element.

The thin-film magnetic head of the present invention will now be described in detail.

Figure 18:
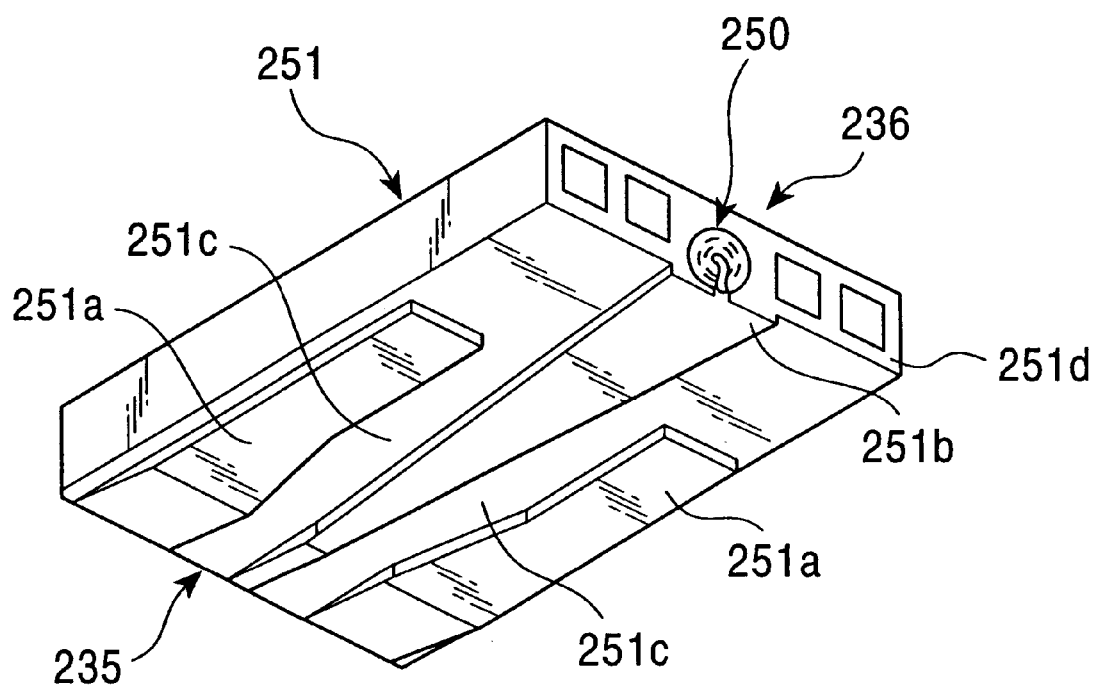
FIG. 18 is a perspective view of a thin-film magnetic head of the present invention.

FIG. 18 is a perspective view of the thin-film magnetic head of the present invention.

This thin-film magnetic head is of a floating type mounted into a magnetic recording unit such as a hard disk drive. With reference to FIG. 18, a slider 251 of the thin-film magnetic head has a leading portion 235 lying at the upstream side of the moving direction of the disk face and a trailing portion 236. The slider 251 has air bearing surfaces (ABSs) 251*a* and 251*b* and air grooves 251*c*. Moreover, the slider 251 is provided with a magnetic core section 250 at the end 251*d* of the trailing portion 236.

Figure 19:
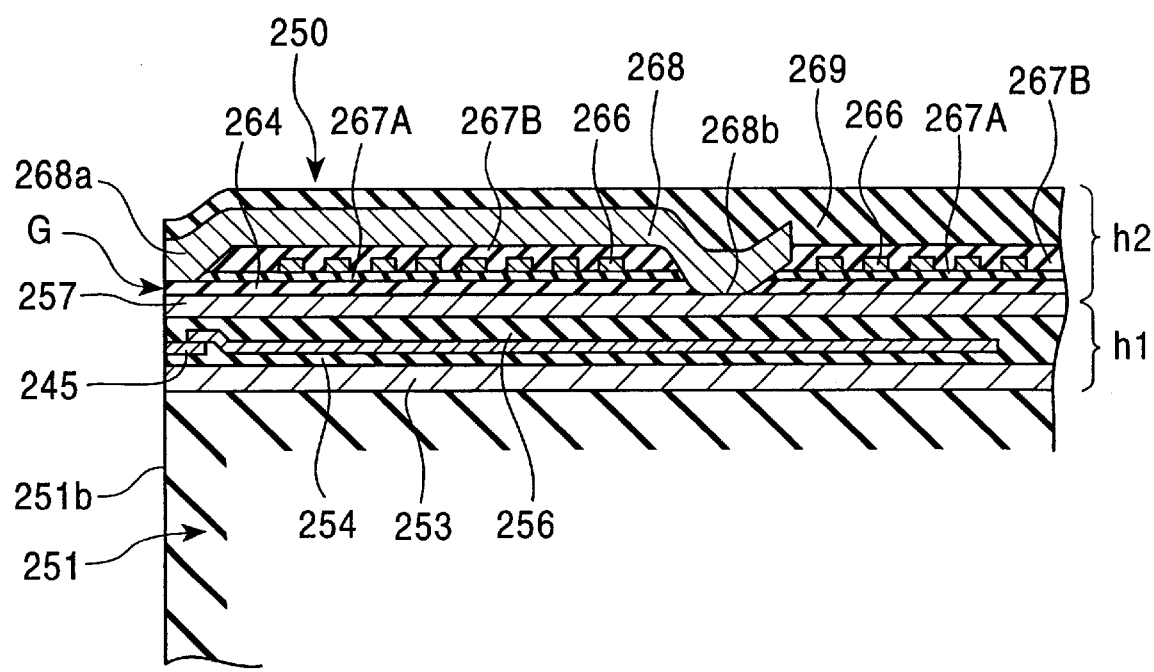
FIG. 19 is a cross-sectional view of a magnetic core section of the thin-film magnetic head shown in FIG. 18.
Figure 20:
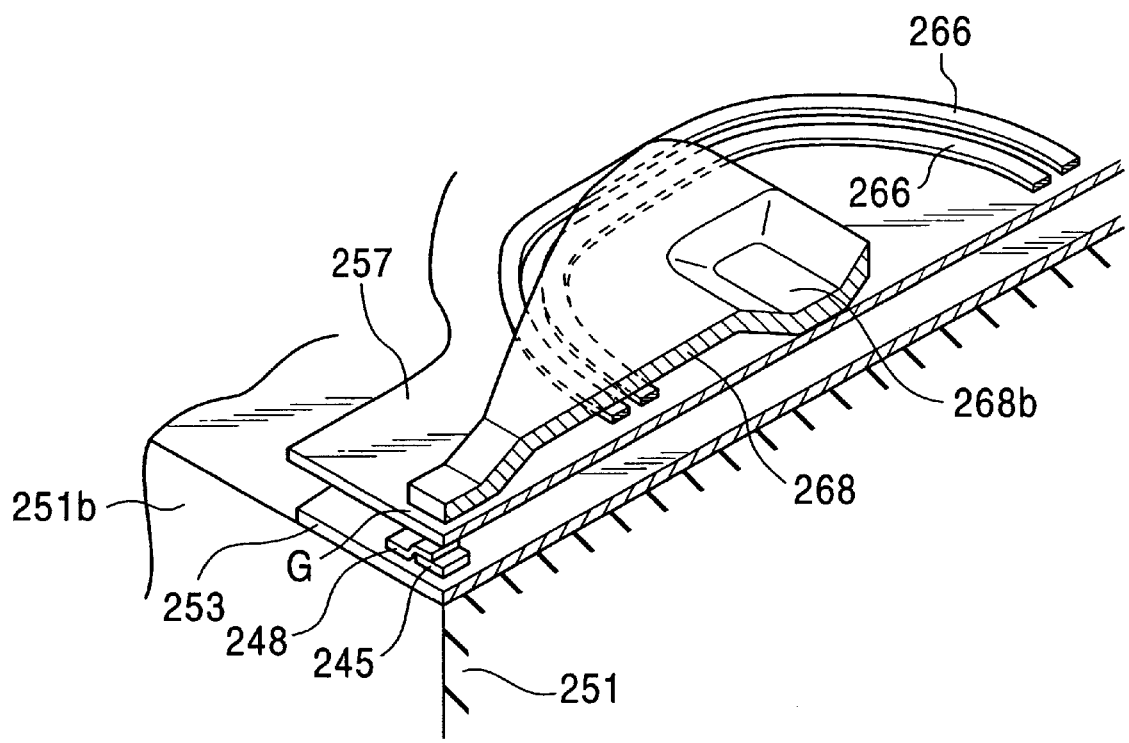
FIG. 20 is an outlined perspective view of the thin-film magnetic head shown in FIG. 19.
Figure 21:
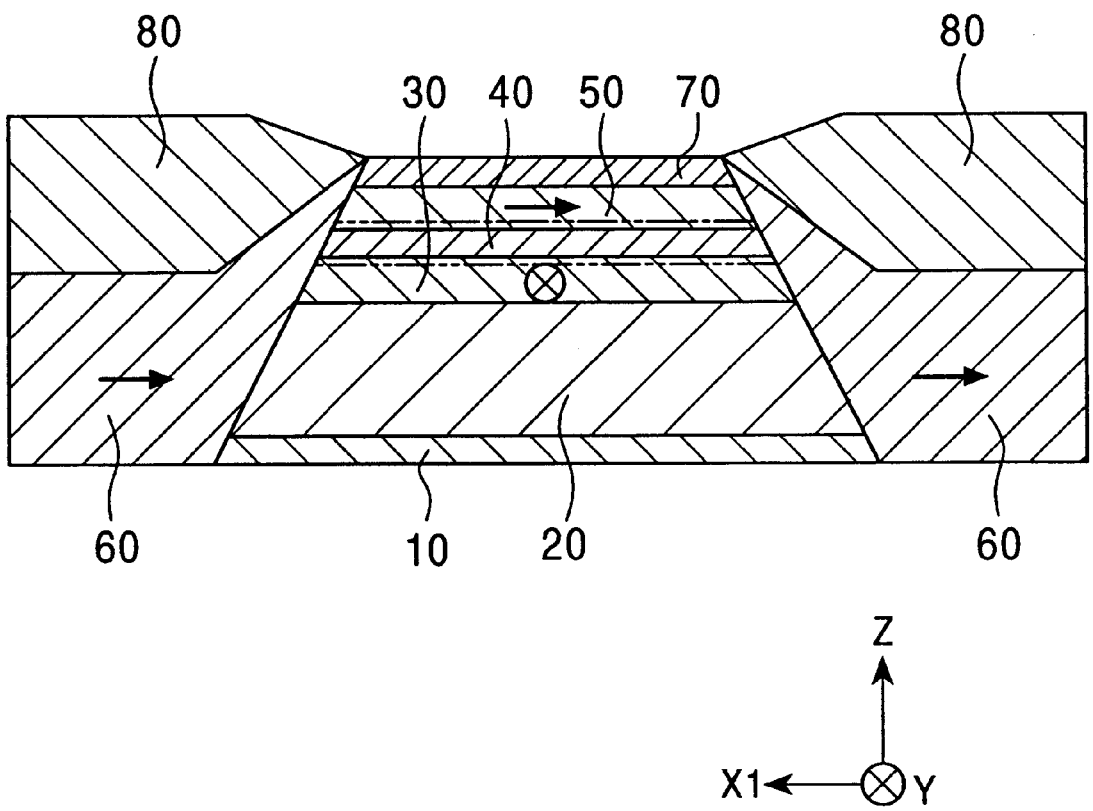
FIG. 21 is a cross-sectional view of a conventional spin-valve thin-film element viewed from a face opposing a recording medium.
Figure 22:
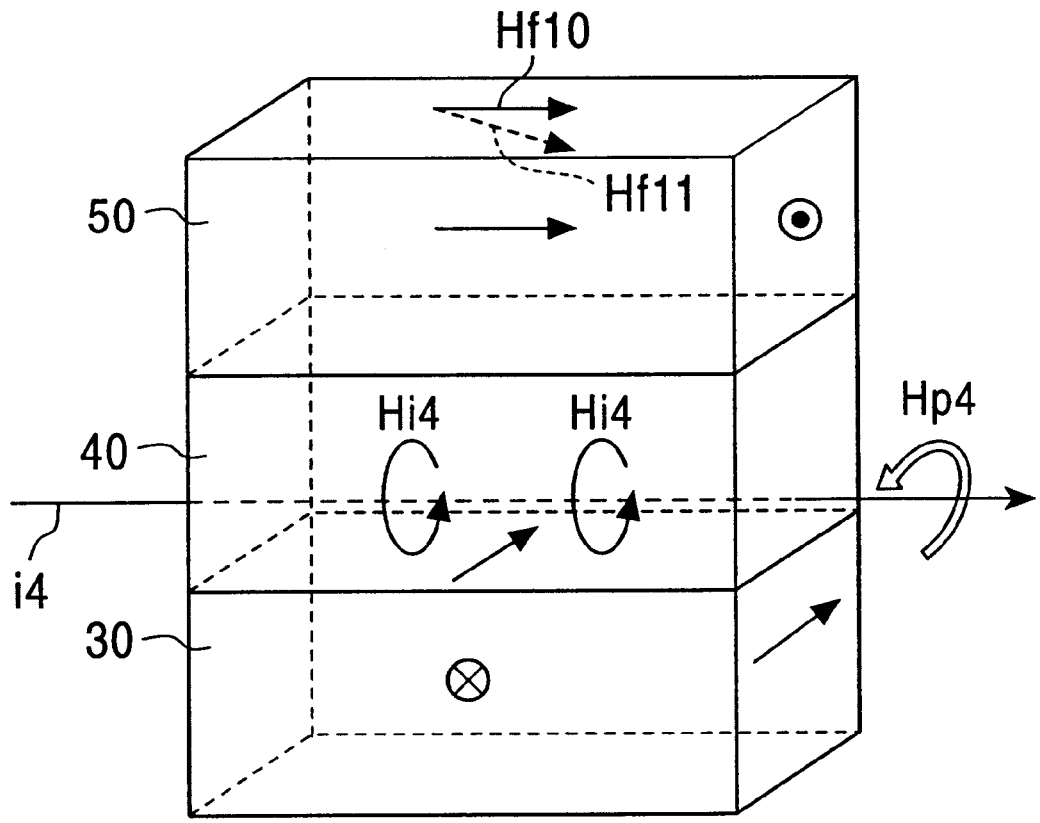
FIG. 22 is a schematic view illustrating magnetization directions of a pinned magnetic layer, a nonmagnetic conductive layer, and a free magnetic layer of the spin-valve thin-film element shown in FIG. 21 when a magnetostatic coupling magnetic field of the pinned magnetic layer and a current magnetic field of a detecting current are oriented in the same direction.
Figure 22:
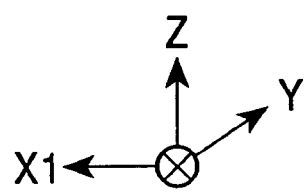
Figure 23:
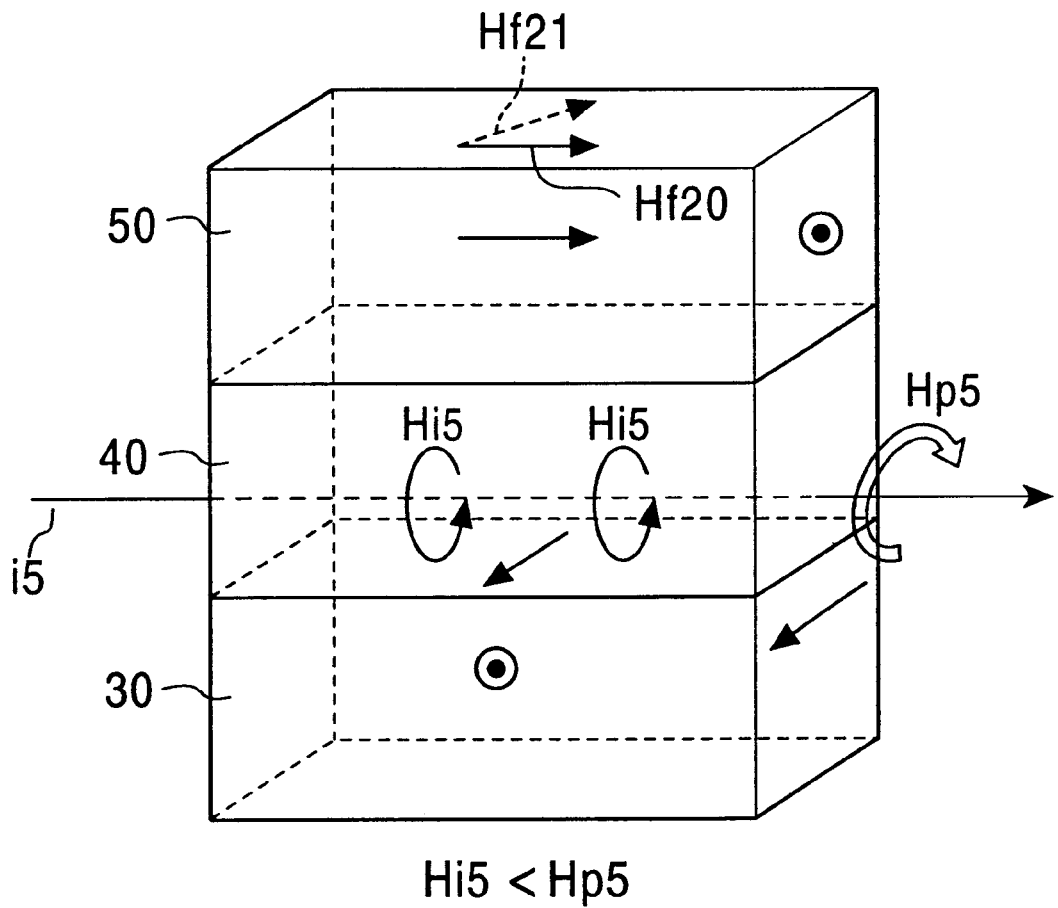
FIG. 23 is a schematic view illustrating magnetization directions of the pinned magnetic layer, the nonmagnetic conductive layer, and the free magnetic layer of the spin-valve thin-film element shown in FIG. 21 when the magnetostatic coupling magnetic field of the pinned magnetic layer and the current magnetic field of the detecting current are oriented in different directions and when the magnetostatic coupling magnetic field is larger than the current magnetic field.
Figure 23:
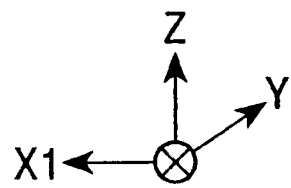
Figure 24:
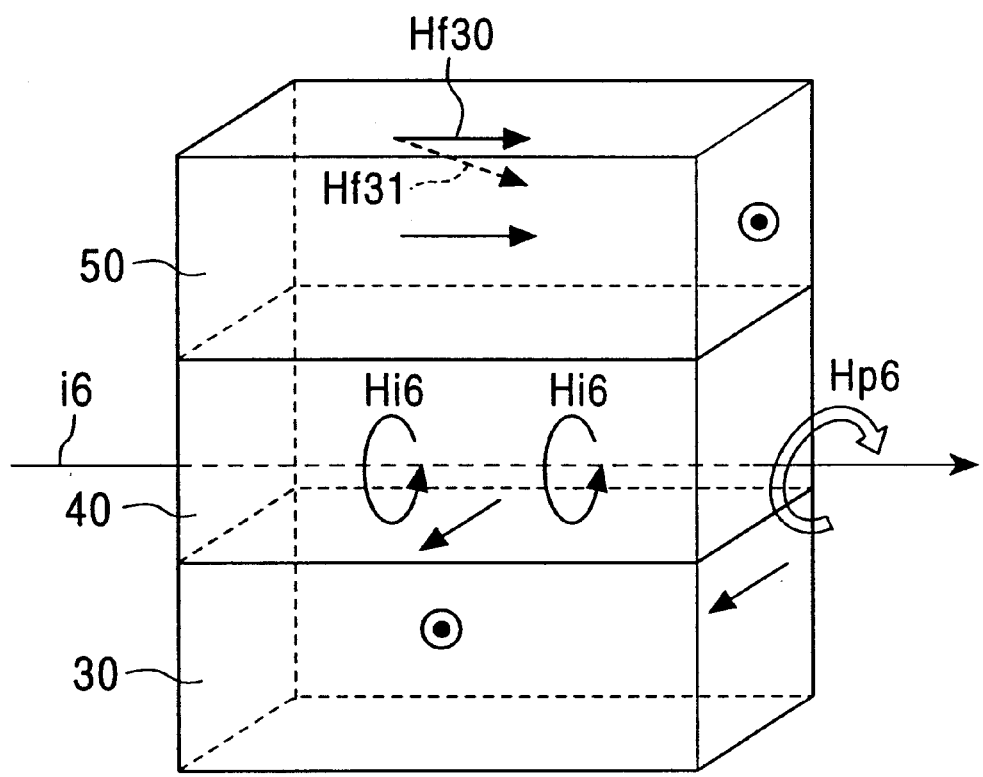
FIG. 24 is a schematic view illustrating magnetization directions of the pinned magnetic layer, the nonmagnetic conductive layer, and the free magnetic layer of the spin-valve thin-film element shown in FIG. 21 when the magnetostatic coupling magnetic field of the pinned magnetic layer and the current magnetic field of the detecting current are oriented in different directions and when the magnetostatic coupling magnetic field is smaller than the current magnetic field.
Figure 24:
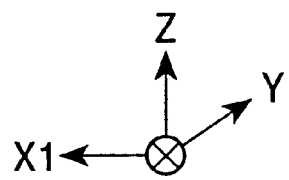
Figure 25:
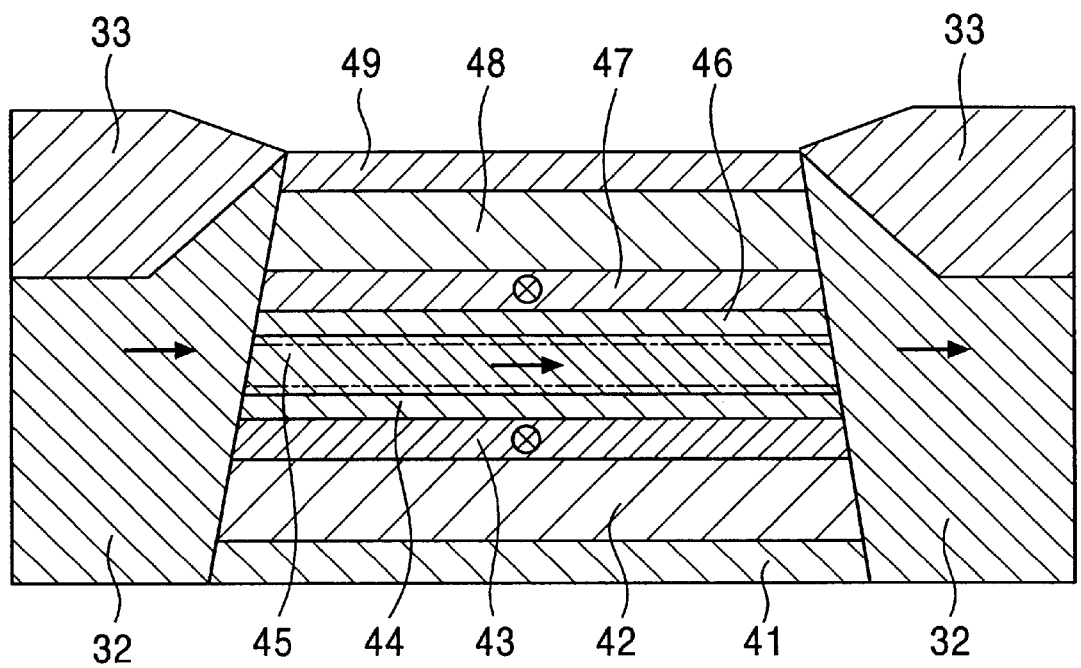
FIG. 25 is a cross-sectional view of another conventional spin-valve thin-film element viewed from a face opposing a recording medium.
Figure 25:
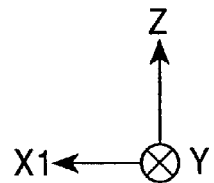
Figure 26:
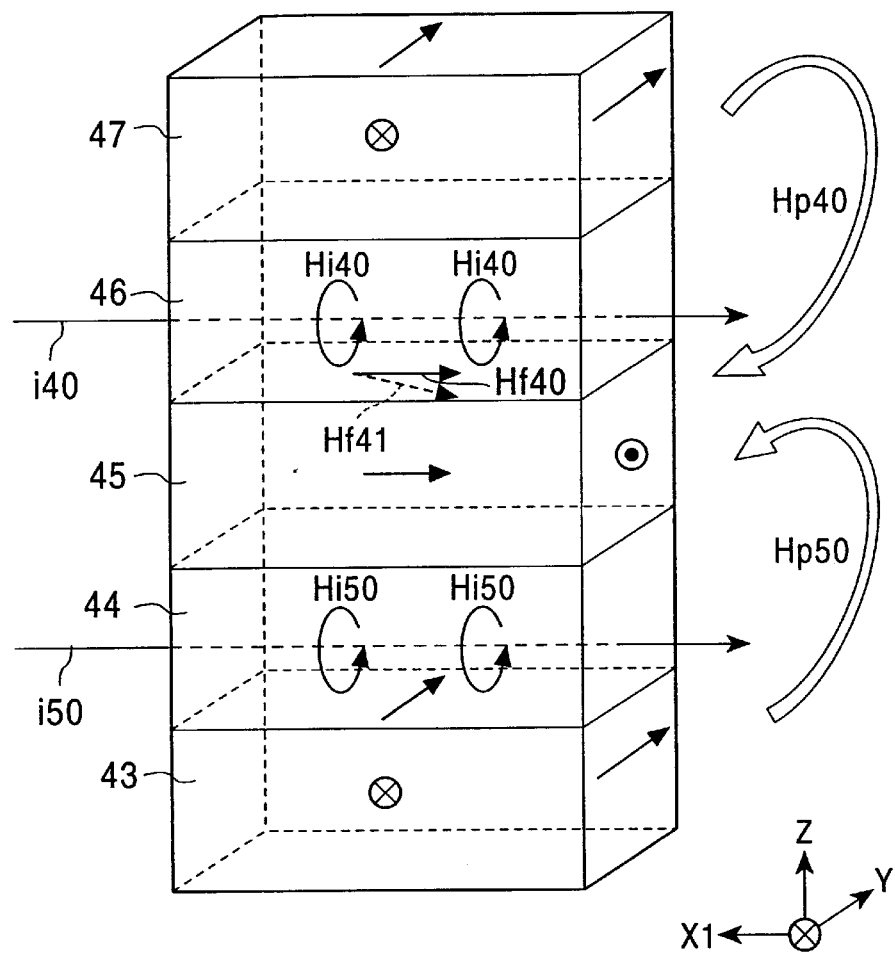
FIG. 26 is a schematic view illustrating magnetization directions of a pinned magnetic layer, a nonmagnetic conductive layer, and a free magnetic layer of the spin-valve thin-film element shown in FIG. 25.
Figure 27:
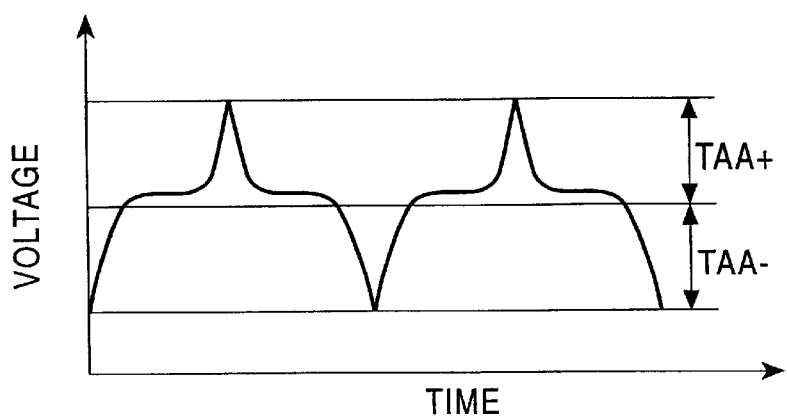
FIG. 27 is a graph illustrating an output waveform.

The magnetic core section 250 comprises a combined magnetic head shown in FIGS. 19 and 20. A MR read head h1 and an inductive write head h2 are deposited in that order on the trailing end 251*d* of the slider 251.

The MR head h1 includes a lower shielding layer 253, which is formed on the trailing end of the slider 251 as a substrate and is composed of a magnetic alloy and a lower gap layer 254 formed thereon. A magnetoresistive element layer 245 is deposited on the lower gap layer 254. An upper gap layer 256 is deposited on the magnetoresistive element layer 245, and an upper shielding layer 257 is formed thereon. The upper shielding layer 257 also functions as a lower core layer of the inductive head h2, which will be provided thereon. The MR head h1 reads contents recorded on a magnetic recording medium such as a hard disk as a change in resistance of the magnetoresistive element layer 245 that is caused by a small fringing magnetic field from the magnetic recording medium. The magnetoresistive element layer 245 of the MR head h1 includes the above-mentioned spin-valve thin-film element. The spin-valve thin-film element is the most important component of the thin-film magnetic head (write head).

The inductive head h2 includes a gap layer 264 formed on the lower core layer 257 and a planar spiral coil layer 266 formed on the gap layer 264. The coil layer 266 is covered with a first insulating layer 267A and a second insulating layer 267B. An upper core layer 268 is formed on the second insulating layer 267B, and a magnetic pole end 68*a* of the upper core layer 268 and the lower core layer 257 face each other and are separated by a magnetic gap G at the ABS surface 251*b*. A base end 268*b* of the upper core layer 268 is magnetically coupled with the lower core layer 257, as shown in FIGS. 19 and 20. A protective layer 269 composed of alumina or the like is formed on the upper core layer 268.

In the inductive head h2, a recording current is supplied to core layer via the coil layer 266. The inductive head h2 records magnetic signals on a magnetic recording medium such as a hard disk based on a fringing magnetic field from the lower core layer 257 and the end 268*a* of the upper core layer 268 at the magnetic gap G.

In the production of the thin-film magnetic head of the present invention, as shown in FIG. 19, the lower gap layer 254 is formed on the lower shielding layer 253 composed of a magnetic material, and then the spin-valve thin-film element constituting the magnetoresistive element layer 245 is formed. The upper gap layer 256 is formed on the spin-valve thin-film element and the lower core layer 257 is formed thereon to complete the MR read head h1.

Next, the gap layer 264 is formed on the lower core layer (upper shielding layer) 257 and the spiral coil layer 266 is formed thereon so that the coil layer 266 is covered with the first insulating layer 267A and the second insulating layer 267B. The upper core layer 268 is formed on the second insulating layer 267B and the protective layer 269 is formed on the upper core layer 268 to complete the thin-film magnetic head.

The thin-film magnetic head including the above spin-valve thin-film element exhibits high thermal resistance, superior reliability, and a reduced asymmetry.

The configuration of the slider component of the thin-film magnetic head and the configuration of the inductive head are not limited to the embodiments shown in FIGS. 18 to 20, and various types of sliders and inductive heads can be used in the present invention.

What is claimed is:

1. A spin-valve thin-film element that receives an electric current from a current source, comprising:

a pinned magnetic layer having a pinned magnetization direction;

a nonmagnetic conductive layer operatively connected to the pinned magnetic layer;

a free magnetic layer operatively connected to the nonmagnetic conductive layer, the free magnetic layer having a variable magnetization direction;

a biasing layer operatively connected to the free magnetic layer, wherein the biasing layer orients the variable magnetization direction in a direction perpendicular to the pinned magnetization direction;

a conductive layer electrically connected to receive the current from the current source and operatively connected to the biasing layer, the conductive layer applying a detecting current to the pinned magnetic layer, the nonmagnetic conductive layer, and the free magnetic layer; and a biasing conductive layer electrically connected to receive the current from the current source and operatively connected to the conductive layer, wherein the biasing conductive layer controls the variable magnetization direction of the free magnetic layer, wherein the current is applied to the biasing conductive layer to form a variable current magnetic field for controlling the variable magnetization direction, wherein the variable current magnetic field has a variable direction, and wherein the intensity of the current in the biasing conductive layer is controlled without affecting the intensity of the detecting current.

2. A spin-valve thin-film element according to claim 1, further comprising an antiferromagnetic layer operatively connected to the pinned magnetic layer, wherein the pinned magnetization direction is pinned by an exchange coupling magnetic field of the pinned magnetic layer and the antiferromagnetic layer.

3. A spin-valve thin-film element according to claim 2, wherein the antiferromagnetic layer is made of an alloy containing Mn and Pt.

4. A spin-valve thin-film element according to claim 3, wherein the content of Pt is in the range of 47 to 63 atomic %.

5. A spin-valve thin-film element according to claim 2, wherein the antiferromagnetic layer is made of an alloy containing Mn and at least one element of Pd, Ru, Ir, Rh, and Os.

6. A spin-valve thin-film element according to claim 5, wherein the content of the at least one element is in the range of 47 to 63 atomic %.

7. A spin-valve thin-film element according to claim 2, wherein the antiferromagnetic layer is made of an alloy containing Mn, Pt, and at least one element of Pd, Ru, Ir, Rh, Os, Au, Ag, Cr, Ni, Ar, Ne, Xe, and Kr.

8. A spin-valve thin-film element according to claim 7, wherein the total content of Pt and the at least one element is in the range of 47 to 57 atomic %, wherein the content of the at least one element is in the range of 0.2 to 10 atomic %.

9. A spin-valve thin-film element according to claim 7, wherein the content of the at least one element is in the range of 0.2 to 40 atomic % when the at least one element is one of Pd, Ru, Ir, Rh, and Os.

10. A spin-valve thin-film element according to claim 2, further comprising a substrate operatively connected to the antiferromagnetic layer.

11. A spin-valve thin-film element according to claim 1, wherein the spin-valve thin-film element has a dual structure.

12. A spin-valve thin-film element according to claim 11, wherein free magnetic layer has a first side and a second side, wherein the nonmagnetic conductive layer, the pinned magnetic layer, and the antiferromagnetic layer are on the first side, the spin-valve thin-film element further comprising:

a second nonmagnetic conductive layer operatively connected to the second side of the free magnetic layer;

a second pinned magnetic layer operatively connected to the second nonmagnetic conductive layer; and a second antiferromagnetic layer operatively connected to the second pinned magnetic layer.

13. A spin-valve thin-film element according to claim 1, wherein the variable direction is opposite to a magnetostatic coupling magnetic field of the pinned magnetic layer.

14. A spin-valve thin-film element according to claim 1, wherein the variable direction varies between at least two variable directions.

15. A spin-valve thin-film element according to claim 1, wherein the biasing conductive layer is in contact with the antiferromagnetic layer.

16. A spin-valve thin-film element according to claim 1, wherein an insulating layer is formed between the biasing conductive layer and the antiferromagnetic layer.

17. A spin-valve thin-film element according to claim 1, wherein the biasing conductive layer and the conductive layer are connected in series.

18. A spin-valve thin-film element according to claim 1, wherein the spin-valve thin-film element is provided in a thin-film magnetic head.

19. A spin-valve thin-film element that receives an electric current from a current source, comprising:

a pinned magnetic layer having a pinned magnetization direction;

a nonmagnetic conductive layer operatively connected to the pinned magnetic layer;

a free magnetic layer operatively connected to the nonmagnetic conductive layer, the free magnetic layer having a variable magnetization direction;

a biasing layer operatively connected to the free magnetic layer, wherein the biasing layer orients the variable magnetization direction in a direction perpendicular to the pinned magnetization direction;

a conductive layer electrically connected to receive the current from the current source and operatively connected to the biasing layer, the conductive layer applying a detecting current to the pinned magnetic layer, the nonmagnetic conductive layer, and the free magnetic layer; and a biasing conductive layer electrically connected to receive the current from the current source and operatively connected to the conductive layer, wherein the biasing conductive layer controls the variable magnetization direction of the free magnetic layer, wherein the current is applied to the biasing conductive layer to form a variable current magnetic field for controlling the variable magnetization direction, wherein the variable current magnetic field has a variable direction, and wherein the variable direction is opposite to a combined magnetization moment of a magnetostatic coupling magnetic field of the pinned magnetic layer and a detecting current magnetic field of the detecting current.

20. A spin-valve thin-film element that receives an electric current from a current source, comprising:

a pinned magnetic layer having a pinned magnetization direction;

a nonmagnetic conductive layer operatively connected to the pinned magnetic layer;

a free magnetic layer operatively connected to the nonmagnetic conductive layer, the free magnetic layer having a variable magnetization direction;

a biasing layer operatively connected to the free magnetic layer, wherein the biasing layer orients the variable magnetization direction in a direction perpendicular to the pinned magnetization direction;

a conductive layer electrically connected to receive the current from the current source and operatively connected to the biasing layer, the conductive layer applying a detecting current to the pinned magnetic layer, the nonmagnetic conductive layer, and the free magnetic layer; and a biasing conductive layer electrically connected to receive the current from the current source and operatively connected to the conductive layer, wherein the biasing conductive layer controls the variable magnetization direction of the free magnetic layer, wherein the current is applied to the biasing conductive layer to form a variable current magnetic field for controlling the variable magnetization direction, wherein the variable current magnetic field has a variable direction, and wherein the variable direction is opposite to a detecting current magnetic field of the detecting current when the direction of a magnetostatic coupling magnetic field of the pinned magnetic layer is the same as the direction of the detecting current magnetic field of the detecting current.

21. A spin-valve thin-film element that receives an electric current from a current source, comprising:

a pinned magnetic layer having a pinned magnetization direction;

a nonmagnetic conductive layer operatively connected to the pinned magnetic layer;

a free magnetic layer operatively connected to the nonmagnetic conductive layer, the free magnetic layer having a variable magnetization direction;

a biasing layer operatively connected to the free magnetic layer, wherein the biasing layer orients the variable magnetization direction in a direction perpendicular to the pinned magnetization direction;

a conductive layer electrically connected to receive the current from the current source and operatively connected to the biasing layer, the conductive layer applying a detecting current to the pinned magnetic layer, the nonmagnetic conductive layer, and the free magnetic layer; and a biasing conductive layer electrically connected to receive the current from the current source and operatively connected to the conductive layer, wherein the biasing conductive layer controls the variable magnetization direction of the free magnetic layer, wherein the current is applied to the biasing conductive layer to form a variable current magnetic field for controlling the variable magnetization direction, wherein the variable current magnetic field has a variable direction, wherein the variable direction varies between at least two variable directions, and wherein the at least two variable directions further comprise two or three of a first direction opposite to a combined magnetization moment of a magnetostatic coupling magnetic field of the pinned magnetic layer and a detecting current magnetic field of the detecting current, a second direction opposite to a detecting current magnetic field of the detecting current when the direction of a magnetostatic coupling magnetic field of the pinned magnetic layer is the same as the direction of a detecting current magnetic field of the detecting current, and a third direction opposite to a magnetostatic coupling magnetic field of the pinned magnetic layer.

22. A spin-valve thin-film element comprising:

a pinned magnetic layer having a pinned magnetization direction;

a nonmagnetic conductive layer operatively connected to the pinned magnetic layer;

a free magnetic layer operatively connected to the nonmagnetic conductive layer, the free magnetic layer having a variable magnetization direction;

a biasing layer operatively connected to the free magnetic layer, wherein the biasing layer orients the variable magnetization direction in a direction perpendicular to the pinned magnetization direction;

a conductive layer operatively connected to the biasing layer, the conductive layer applying a detecting current to the pinned magnetic layer, the nonmagnetic conductive layer, and the free magnetic layer;

a biasing conductive layer operatively connected to the conductive layer, wherein the biasing conductive layer controls the variable magnetization direction of the free magnetic layer; and at least one current applying means for applying a current to the conductive layer and the biasing conductive layer, wherein the at least one current applying means comprises a first current applying means and a second current applying means, the first current applying means connected to the biasing conductive layer, the second current applying means connected to the conductive layer.

23. A spin-valve thin-film element according to claim 22, wherein the spin-valve thin-element has a dual structure.

24. A spin-valve thin-film element according to claim 23, wherein the current is applied to the biasing conductive layer to form a current magnetic field in a direction opposite to a magnetostatic coupling magnetic field of the pinned magnetic layer.

25. A spin-valve thin-film element according to claim 22, wherein, when the direction of a magnetostatic coupling magnetic field of the pinned magnetic layer is the same as the direction of a current magnetic field of the detecting current, a current is applied to the biasing conductive layer to form a current magnetic field in a direction opposite to the current magnetic field of the detecting current.

26. A spin-valve thin-film element according to claim 22, wherein the biasing conductive layer is in contact with the antiferromagnetic layer.

27. A spin-valve thin-film element according to claim 22, wherein the biasing conductive layer and the conductive layer are connected in series.

28. A spin-valve thin-film element according to claim 22, wherein the spin-valve thin-film element is provided in a thin-film magnetic head.

29. A spin-valve thin-film element comprising:

a substrate;

an antiferromagnetic layer on the substrate;

a pinned magnetic layer in contact with the antiferromagnetic layer, the pinned magnetic layer having a pinned magnetization direction pinned by an exchange coupling magnetic field of the pinned magnetic layer and the antiferromagnetic layer;

a free magnetic layer having a variable magnetization direction;

a nonmagnetic conductive layer between the pinned magnetic layer and the free magnetic layer;

a biasing layer for orientating the variable magnetization direction in a direction perpendicular to the pinned magnetization direction;

a conductive layer applying a detecting current to the pinned magnetic layer, the nonmagnetic conductive layer, and the free magnetic layer;

a biasing conductive layer for controlling the variable magnetization direction of the free magnetic layer; and at least one current applying means for applying a current to the conductive layer and the biasing conductive layer, wherein the current is applied to the biasing conductive layer to form a current magnetic field in a direction opposite to a combined magnetization moment of a magnetostatic coupling magnetic field of the pinned magnetic layer and a current magnetic field of the detecting current.

30. A spin-valve thin-film element according to claim 29, wherein the spin-valve thin-film element has a dual structure.

31. A spin-valve thin-film element according to claim 30 in which the nonmagnetic conductive layer, the pinned conductive layer, and the antiferromagnetic layer are formed on both sides of the free magnetic layer in the thickness direction.

32. A spin-valve thin-film element according to claim 29, wherein an insulating layer is formed between the biasing conductive layer and the antiferromagnetic layer.

33. A spin-valve thin-film element according to claim 29, wherein said at least one current applying means comprises a first current applying means and a second current applying means, the first current applying means connected to the biasing conductive layer, the second current applying means connected to the conductive layer.

* * * * *

UNITED STATES PATENT AND TRADEMARK OFFICE
CERTIFICATE OF CORRECTION

PATENT NO.    : 6,519,122 B1
DATED         : February 11, 2003
INVENTOR(S)   : Yoshihiko Kakihara It is certified that error appears in the above-identified patent and that said Letters Patent is hereby corrected as shown below:

<u>Title page,</u>
Item [74], delete "Giloson" and substitute -- Gilson -- in its place.

Signed and Sealed this

First Day of July, 2003

JAMES E. ROGAN
*Director of the United States Patent and Trademark Office*